US012501231B1

(12) United States Patent
Petrolli et al.

(10) Patent No.: US 12,501,231 B1
(45) Date of Patent: Dec. 16, 2025

(54) METHOD FOR ITERATIVE, MULTI-OBJECTIVE OPTIMIZATION OF ACOUSTICAL DESIGN TO IMPROVE AUDIO PERCEPTION

(71) Applicant: RediAcoustics, LLC, Highland, NY (US)

(72) Inventors: Rinaldi P. Petrolli, Rio Grande do Sul (BR); Peter D'Antonio, Bowie, MD (US); Artur Zorzo Leao, Lisbon (PT)

(73) Assignee: REDI ACOUSTICS, LLC, Highland, NY (US)

( * ) Notice: Subject to any disclaimer, the term of this patent is extended or adjusted under 35 U.S.C. 154(b) by 0 days.

(21) Appl. No.: 19/209,245

(22) Filed: May 15, 2025

(51) Int. Cl.
*H04S 3/00* (2006.01)
*H04S 7/00* (2006.01)

(52) U.S. Cl.
CPC .............. *H04S 7/305* (2013.01); *H04S 3/008* (2013.01); *H04S 7/303* (2013.01); *H04S 2400/01* (2013.01); *H04S 2400/11* (2013.01)

(58) Field of Classification Search
None
See application file for complete search history.

(56) References Cited

U.S. PATENT DOCUMENTS

2003/0235318 A1* 12/2003 Bharitkar .................. H04S 7/30 381/61
2005/0031129 A1* 2/2005 Devantier ............... H04S 7/301 381/18
2009/0202082 A1* 8/2009 Bharitkar .................. H04S 7/30 381/17
2011/0081023 A1* 4/2011 Raghuvanshi ............ H04S 7/30 381/17

* cited by examiner

*Primary Examiner* — Qin Zhu
(74) *Attorney, Agent, or Firm* — H. Jay Spiegel

(57) ABSTRACT

A method for optimizing acoustic performance in listening spaces addresses limitations in room acoustics for music production and reproduction. The method comprises two optimization steps: a multi-objective room optimization method applicable to any room shape and a multi-objective treatment optimization method that iteratively searches a library of potential acoustical treatments to determine optimal solutions for each accessible area. The method utilizes a multi-objective search engine to simultaneously optimize several critical acoustic metrics, including low-frequency response, spatial variation around listening positions, early reflections, modal temporal decay, and mid-to-high-frequency reverberation time. The integration of both optimization methods provides comprehensive acoustic control across the entire audible spectrum.

20 Claims, 26 Drawing Sheets

| Forms of Acoustical Distortion | | |
|---|---|---|
| **Problem** | **Cause** | **Solution** |
| **Low-Frequency Range** | | |
| Room Modes | 1. Room geometry<br>2. Speaker and listener placement<br>3. Lack of low-frequency absorption | 1. Optimal geometry<br>2. Optimal speaker and listener placement<br>3. Optimal treatment design and placement |
| Speaker-Boundary Interference | 1. Omnidirectional low-frequency interference with adjacent room boundaries<br>2. Lack of low-frequency absorption | 1. Flush/trihedral speaker mounting<br>2. Optimal speaker placement<br>3. Optimal low-frequency treatment design and placement |
| **Mid and High-Frequency Ranges** | | |
| Comb Filtering | 1. Coherent interference between a sound and a delayed specular reflection<br>2. Parallel reflecting surfaces | 1. Optimal geometry<br>2. Broadband treatment placement |
| Poor Diffusion | 1. Non-mixing environment<br>2. Too much absorption<br>3. Poorly designed diffusive surfaces | 1. Optimal design and placement of absorbers<br>2. Optimal placement of broad bandwidth diffuser design |

FIG. 3

| Frequency [Hz] | nx | ny | nz | Type |
|---|---|---|---|---|
| 34.3 | 1 | 0 | 0 | Axial |
| 42.9 | 0 | 1 | 0 | Axial |
| 54.9 | 1 | 1 | 0 | Tangential |
| 57.2 | 0 | 0 | 1 | Axial |
| 66.7 | 1 | 0 | 1 | Tangential |
| 71.5 | 0 | 1 | 1 | Tangential |
| 79.3 | 1 | 1 | 1 | Oblique |

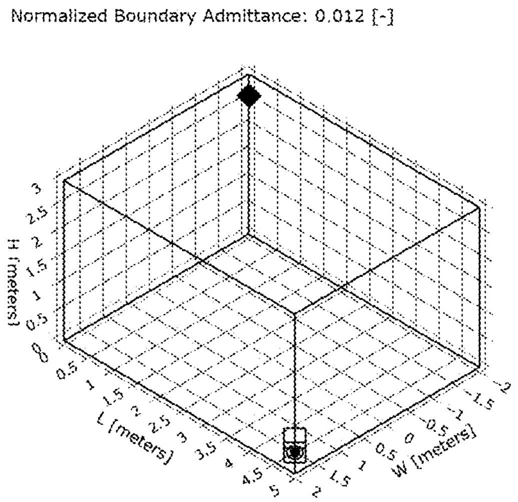
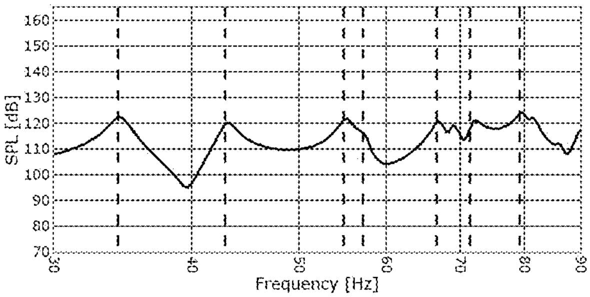
| Frequency [Hz] | nx | ny | nz | Type |
|---|---|---|---|---|
| 34.3 | 1 | 0 | 0 | Axial |
| 42.9 | 0 | 1 | 0 | Axial |
| 54.9 | 1 | 1 | 0 | Tangential |
| 57.2 | 0 | 0 | 1 | Axial |
| 66.7 | 1 | 0 | 1 | Tangential |
| 71.5 | 0 | 1 | 1 | Tangential |
| 79.3 | 1 | 1 | 1 | Oblique |
FIG. 18
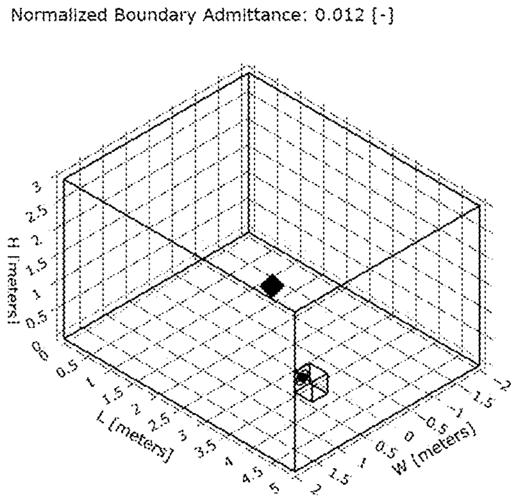
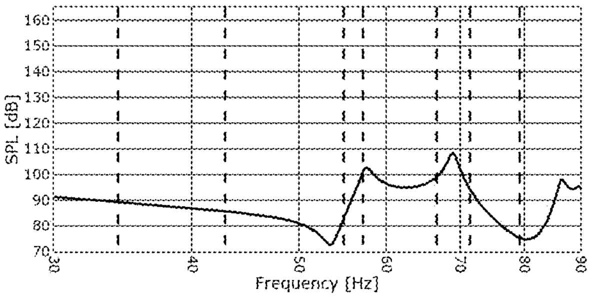
| Frequency [Hz] | nx | ny | nz | Type |
|---|---|---|---|---|
| 34.3 | 1 | 0 | 0 | Axial |
| 42.9 | 0 | 1 | 0 | Axial |
| 54.9 | 1 | 1 | 0 | Tangential |
| 57.2 | 0 | 0 | 1 | Axial |
| 66.7 | 1 | 0 | 1 | Tangential |
| 71.5 | 0 | 1 | 1 | Tangential |
| 79.3 | 1 | 1 | 1 | Oblique |
FIG. 19

METHOD FOR ITERATIVE, MULTI-OBJECTIVE OPTIMIZATION OF ACOUSTICAL DESIGN TO IMPROVE AUDIO PERCEPTION

BACKGROUND OF THE INVENTION

The present invention relates to a method of optimizing audio perception in listening spaces.

Sound perception in room environments is influenced by the interaction of multiple factors: the room's dimensional properties, shape, boundary surface impedance characteristics, as well as the placement and spectral, spatial, and temporal characteristics of loudspeakers, and the locations of listeners.

At mid- and high-frequencies, sound perception is dominated by direct sound, which may be compromised by comb filtering caused by delayed reflections from adjacent walls, ceilings, floors, and furniture. These reflections create interference patterns that distort the frequency response, reducing clarity and detail in audio reproduction. At low frequencies, sound behavior is governed by modal resonances, manifesting as standing waves that form between surfaces in the room. These resonances create peaks and nulls in the frequency response, resulting in non-uniform bass reproduction and compromised tonal balance. Additionally, the temporal decay of these modes can cause excessive resonance or spectral masking in the low-frequency range, further degrading the listening experience. The interaction of these modal resonances with the room's geometry, loudspeaker placement, and listener position significantly influences the perceived quality of low-frequency sound, making it a critical factor in the design of acoustically neutral spaces.

The present invention provides a method for minimizing acoustical distortion through iterative optimization software tools. These tools address the complex interaction of room geometry, loudspeaker placement, listener positioning, and acoustical treatments to create a neutral acoustic environment. In production spaces, such as recording studios, this neutrality ensures that audio content remains faithful to the original performance, allowing it to be transferable and accurately reproduced in other listening environments. In reproduction spaces, such as home cinemas or high-end listening rooms, it enables accurate reproduction of audio content as intended by the creators, free from coloration introduced by room acoustics. This principle is embodied in the expression, "If you can't take the room out of the mix, you can't take the mix out of the room."

The traditional design of critical listening rooms has been based on trial and error, experiential learning and the use of commercial software to evaluate a range of standardized objective metrics in a series of conceptual designs. While this can be successful, itis a laborious process and does not guarantee that the optimal solution has been found. An initial attempt to address iterative acoustical room design at low frequencies in cuboid (rectangular) spaces using an image source method to optimize dimensional room ratios was published by Cox and D'Antonio with their Room Sizer software ("Room Sizing and Optimization at Low Frequencies" by Cox, Trevor J. & D'Antonio, Peter & Avis, M R in *J. Audio Eng. Soc.,* 2004). Cox and D'Antonio also published work describing a program called Room Optimizer ("Room Optimizer: A Computer Program to Optimize the Placement of Listener, Loudspeakers, Acoustical Surface Treatment and Room Dimensions in Critical Listening Rooms" by Cox, Trevor J. & D'Antonio, Peter in *J. Audio Eng. Soc.,* 1997) to iteratively optimize the location of loudspeakers and listeners in cuboid rooms. Other non-iterative approaches utilize published dimensional ratios and reverberation time calculations of a given design. None of these approaches can iteratively determine the optimal acoustical design over the entire audio spectrum.

The present invention extends the optimization of listening rooms to spaces of any size and shape, covering the entire audio spectrum through the integration of wave-based and geometrical acoustics. The invention introduces a novel iterative solution combining room geometry and treatment optimization. Using a multi-objective search engine, the invention evaluates thousands of potential solutions that simultaneously satisfy published objective measurement standards. This ensures that no single metric is optimized at the expense of others and that the optimal solution is identified across all critical metrics, including low-frequency response, spatial variation across the listening area, modal temporal decay, and reverberation time.

Unlike prior approaches, which focus primarily on room geometry or rely on non-iterative methods, the present invention addresses optimizing acoustical treatments and room geometry and positions of loudspeakers and listeners. By leveraging a library of pre-qualified acoustical materials and advanced acoustic treatment modeling techniques based on the Transfer Matrix Method, the invention determines the optimal placement and configuration of absorbers, diffusers, and resonators to achieve a balanced acoustic environment.

The method includes aspects including a process of non-cuboid iterative room multi-objective optimization and a process of iterative acoustical treatment multi-objective optimization for room acoustics, all described hereinafter. Acoustical software is combined with the hardware consisting of measuring the room's boundaries, the physical and acoustical characteristics of the intended free-standing or soffit-mounted loudspeaker system, the prescribed acoustical treatments, and the room's furnishings.

SUMMARY OF THE INVENTION

The present invention provides a two-step acoustic optimization methodology, each step being an independent yet complementary process. In the first step, a multi-objective search algorithm simultaneously optimizes room geometry, provided the geometry is adjustable, and the spatial positioning of loudspeakers and listeners to enhance low-frequency response, spatial variation, and reflection control, and is applicable to rooms of any shape or configuration. If the room geometry is fixed, this phase optimizes only the loudspeaker and listener positions within the predefined space. In the second step, a separate optimization process determines the selection and placement of acoustical treatments to further refine the low-frequency response, spatial consistency around the listening position, modal temporal decay characteristics, and overall reverberation time. While the two phases are designed to be implemented sequentially—first optimizing geometry and placement of speakers and receivers, then optimizing acoustical treatments—each phase constitutes a standalone method that can be implemented independently in scenarios where only one aspect of the optimization is required.

The present invention includes the following interrelated objects, aspects, and features:

1. In a first embodiment, the present invention employs a multi-objective non-cuboid room optimization method to determine the optimal room geometry, when such geometry is subject to modification, and the ideal locations for loudspeakers and listeners. The optimization process requires the following inputs:

a) The type of loudspeaker, physical dimensions, frequency, and polar response;

b) The accessible areas for room dimensions, loudspeakers, and listeners;

c) A description of the room boundaries and impedance specifications.

2 In a second embodiment, once the room geometry, loudspeaker positions, and listener locations are determined, the present invention employs a multi-objective treatment optimization method to identify the optimal acoustical treatments for all accessible areas within the room. This method iteratively searches a comprehensive library of pre-qualified and/or measured acoustical treatments, including diffusers, porous absorbers, mid-band absorbers, broadband absorbers, and dedicated low-frequency resonant absorbers for the optimal treatment for all accessible areas in the room. The optimization process requires the following inputs:

a) A library of examples of porous absorbers, low-frequency absorbers, and diffusers, including commercial products and devices developed using the Transfer Matrix Method specifically for each project;

b) Knowledge of limitations in criteria for surface areas and depths of accessible areas for acoustical treatments allowed by the prescribed architecture.

Objects of the Present Invention

It is the first object of the present invention to provide a method for optimizing audio perception in listening spaces through the use of a multi-objective search engine. This engine is capable of optimizing both the geometry of a room, when such geometry is subject to modification, and the positions of loudspeakers and listeners within the room. The invention is applicable to rooms of any conceivable geometry, including those with fixed dimensions, where only the placement of loudspeakers and listeners is optimized. By simultaneously addressing low-frequency response, spatial variation, number of early reflections, and the minimization of acoustical distortions, the invention ensures optimal audio performance in audio production spaces, such as recording studios, mixing and mastering control rooms, and reproduction rooms, such as home cinemas and listening rooms.

It is a further object of the present invention to optimize the design of cuboid listening rooms by determining the optimal room dimensions, loudspeaker positions, and listener locations. For rooms where the geometry is fixed, the invention optimizes the placement of loudspeakers and listeners within the given constraints. For rooms where the geometry can be modified, the invention simultaneously determines the optimal length, width, and height of the room, along with the positions of loudspeakers and listeners, to achieve a balanced low-frequency response and spatial uniformity.

It is a yet further object of the present invention to enable searching of a library of acoustical materials to determine the optimal acoustical treatments for each accessible area in the room that the architecture will permit by simultaneously optimizing low-frequency response, spatial variation around the listening position, modal temporal decay, and reverberation time. The library consists of a wide range of acoustical treatments, including commercial products and high and mid-frequency porous absorbers with varying flow resistivities, thicknesses, and cavity depths. It also includes multiple face plates with different thicknesses and open area percentages, along with porous fillings and adjustable cavity depths, enabling the creation of different multi-layered acoustical treatments that can be predicted using the Transfer Matrix Method and complemented with measured data.

These and other objects, aspects, and features of the present invention will be better understood from the following detailed description of the preferred embodiments when read in conjunction with the appended drawing figures.

BRIEF DESCRIPTION OF THE DRAWINGS

FIG. 3 shows descriptions of the forms of acoustical distortion and their causes and solutions.

FIG. 4 shows a graph of amplitude versus frequency obtained by applying the invention.

FIG. 5 shows images related to the perception and evaluation of low-frequency temporal decay.

FIG. 6 shows images related to the recommended limits and evaluation of reverberation time.

FIG. 7 shows graphs related to the perception of early reflections.

FIG. 9 is based on *Acústica de Salas: Projeto e Modelagem* by Brandão, Eric, 2018 and *Recording Studio Design* by Newell, Philip, 2017.

FIG. 12 shows images explaining Stochastic Ray Tracing (SRT). FIG. 12A, FIG. 12B, and FIG. 12C are based on *Master Handbook of Acoustics* by Everest, F. Alton & Pohlmann, Ken, 2021.

FIG. 13 shows images explaining the Image Source Method (ISM). FIG. 13A and FIG. 13B are based on *Master Handbook of Acoustics* by Everest, F. Alton & Pohlmann, Ken, 2021.

FIG. 14 is based on *Combined Wave And Ray Based Room Acoustic Simulations Of Small Rooms* by Aretz, Marc, 2012.

FIG. 18 shows images illustrating the room modes and low-frequency response of a cuboid room with compliant walls, where the source and receiver are positioned at opposite diagonal corners.

FIG. 19 shows images illustrating the room modes and low-frequency response of a cuboid room with compliant walls, where the source and receiver are positioned at a common listening position.

FIG. 20 illustrates two models of the example cuboid rooms. FIG. 20A depicts a non-optimal room, while

FIG. 21 illustrates the frequency response results obtained using the room optimization method. FIG. 21A shows the response for a non-optimized cuboid room, while

FIG. 22 shows the spatial variation results obtained using the room optimization method. FIG. 22A shows the spatial variation in a non-optimized cuboid room, while

FIG. 23 illustrates two example models of non-cuboid rooms. FIG. 23A depicts a non-optimal room, while

FIG. 24 shows the reflectogram results of the non-cuboid room examples obtained using the room optimization method. FIG. 24A shows the reflectogram for a non-optimized room, while

FIG. 25 shows the frequency response results obtained using the room optimization method for a non-cuboid room. FIG. 25A shows the frequency response for a non-optimized room, while

FIG. 26 shows the spatial variation results obtained using the room optimization method for a non-cuboid room. FIG. 26A shows the spatial variation for a non-optimized room, while

FIG. 28 shows the absorption results obtained using the treatment optimization method for a cuboid room. FIG. 28A shows the absorption coefficient curves for the selected option of each of the seven available treatment locations in a non-optimized configuration, while

FIG. 29 shows the frequency response results obtained using the treatment optimization method for a cuboid room. FIG. 29A shows the frequency response for a non-optimized room, while

FIG. 30 shows the spatial variation results obtained using the treatment optimization method for a cuboid room. FIG. 30A shows the spatial variation plot for a non-optimized room, while

FIG. 31 shows the temporal decay results obtained using the treatment optimization method for a cuboid room. FIG. 31A shows the temporal decay plot for a non-optimized room, while

FIG. 32 shows the reverberation time results obtained using the treatment optimization method for a cuboid room. FIG. 32A shows the T30 reverberation time for a non-optimized room, while

FIG. 34 shows the absorption results obtained using the treatment optimization method for a non-cuboid room. FIG. 34A shows the absorption coefficient curves for the selected option of each of the nine available treatment locations in a non-optimized configuration, while

FIG. 35 shows the frequency response results obtained using the treatment optimization method for a non-cuboid room. FIG. 35A shows the frequency response for a non-optimized room, while

FIG. 36 shows the spatial variation results obtained using the treatment optimization method for a non-cuboid room. FIG. 36A shows the spatial variation for a non-optimized room, while

FIG. 37 shows the temporal decay results obtained using the treatment optimization method for a non-cuboid room. FIG. 37A shows the temporal decay for a non-optimized room, while

FIG. 38 shows the reverberation time (T30) results obtained using the treatment optimization method for a non-cuboid room. FIG. 38A shows the reverberation time for a non-optimized room, while

SPECIFIC DESCRIPTION OF THE PREFERRED EMBODIMENTS

Figure 1A:
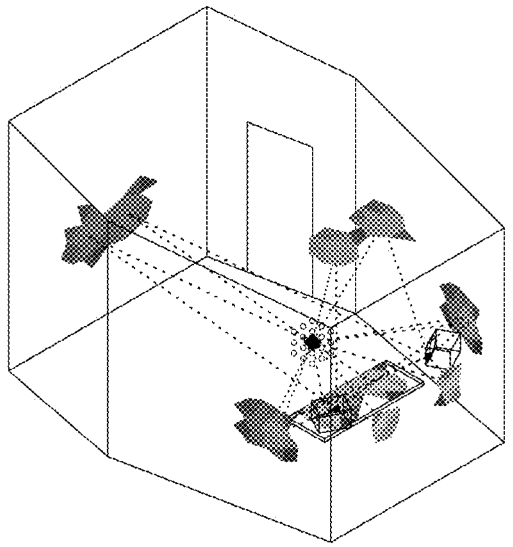
FIG. 1A shows interfering specular reflections and corresponding offending surfaces.

Critical listening environments are the final component in the sound reproduction from the loudspeaker to the listener's ear. This element is notably the most unpredictable and challenging to standardize within the reproduction chain, and the performance of loudspeakers is significantly hindered in rooms with poor acoustics.

Different room types impose unique acoustic requirements based on their intended use. Control rooms require a neutral acoustic environment to hear the music without the room's acoustical characteristics. Recording studios need controlled acoustics that balance liveliness with the correct mixture of diffusion and absorption. Concert halls demand longer reverberation times and specific early reflection patterns to create an immersive musical experience. Home theaters require a balance between accuracy and enjoyment, while conference rooms prioritize speech intelligibility above all else.

Rooms with elevated acoustic liveliness are often perceived as more musical and can offer broader stereo imaging across a wider listening area. Conversely, while less conducive to the enjoyment of music, highly damped rooms provide more accurate timbre and detail perception (see *Recording Studio Design* by Newell, Philip, 2017). This fundamental tradeoff between spaciousness and detail perception creates different requirements for different room types, requiring carefully optimized solutions for each specific use case.

The potential forms of acoustical distortion include Room Modes, Speaker-Boundary Interference Response (SBIR), Comb Filtering, and Poor Diffusion (FIG. 3).

Room modes and their characteristics are fundamentally determined by room geometry, with their perceptual impact governed by the complex interrelationship between source and listener positioning. Specifically, the source location determines which modal resonances are excited within the space, while the listener location determines which of these modes are perceived. The present invention addresses this acoustic challenge through the optimization of room geometry, positioning of speakers and listeners, and acoustic treatment designs to minimize modal irregularities.

The SBIR phenomenon results from coherent interference between loud speakers and the adjacent room boundaries, which also depends on speaker placement. It can be improved by adding acoustical treatment and flush mounting the speakers.

Comb filtering occurs due to coherent interference between direct sound and a single discrete reflection, creating a series of peaks and nulls in the frequency response. The severity of comb filtering depends on the relative amplitude and delay of the reflection. It can be mitigated by increasing diffusion, altering the reflection path, or using broadband absorption to reduce the strength of the reflected sound.

A lack of diffusion results in an acoustically imbalanced space where sound reflections are either too concentrated or overly absorbed, diminishing clarity and envelopment. Diffusion can be improved by incorporating sound-diffusive surfaces, such as quadratic residue or fractal diffusers, which scatter sound waves in multiple directions. Ensuring that diffuse reflections arrive at the listening position from varied angles with low interaural cross-correlation to maximize the sense of envelopment.

To mitigate these unwanted acoustic effects that degrade sound quality, the present invention establishes a neutral acoustic environment that preserves the natural characteristics of the recorded or reproduced content without imposing additional coloration or temporal artifacts. This neutrality is achieved by minimizing modal and SBIR interference while ensuring the room does not introduce extraneous reverberation or reflections that could mask or alter the intended sound. The invention accomplishes this through the implementation of five distinct objective metrics:

(1) controlled low-frequency response, (2) minimized spatial variation around the listening position, (3) controlled modal temporal decay, (4) controlled mid-to-high-frequency reverberation, and (5) controlled early reflections.

Figure 4A:
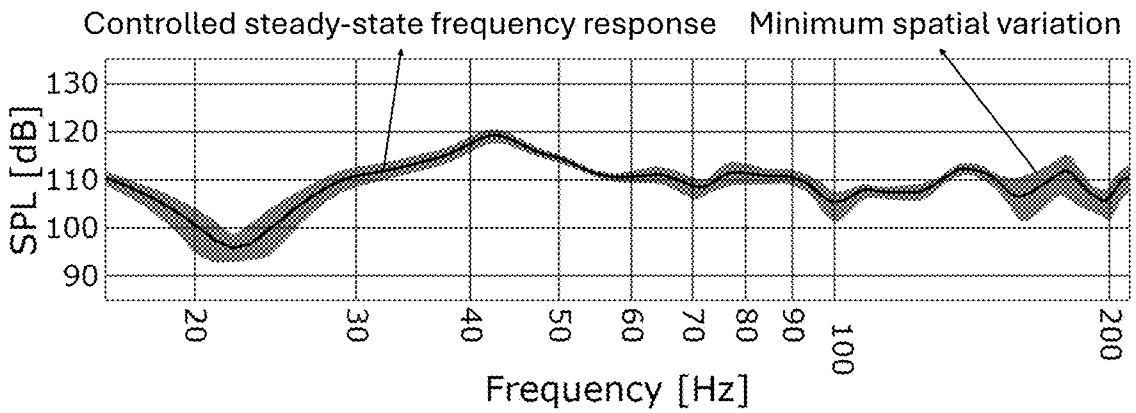
FIG. 4A shows the desired characteristics of the low-frequency response, specifically, a controlled frequency response average curve exhibiting minimal spatial variation.

First, the invention establishes a flat, controlled, low-frequency response with minimal spatial variation around the listening position. This involves analyzing the narrowband frequency response at the listening position and how it varies in a grid of points covering the listening area, as illustrated in FIG. 4. An extensive survey ("The Quality of Professional Surround Audio Reproduction, A Survey Study" by Makivirta, Aki & Anet, Christophe in *J. Audio Eng. Soc.*, 2001) analyzed 250 different frequency responses measured at the engineer's position in different rooms, which led to the conclusion that in most successful situations, the average third-octave smoothed frequency response tends to be flat. A flat response in studios ensures that music is reproduced faithfully, without bias towards any specific listening condition.

The invention quantifies the flatness of the low-frequency response by calculating the average sound pressure level across the frequency response and establishing frequency-dependent tolerance limits centered around the mean value.

Figure 4B:
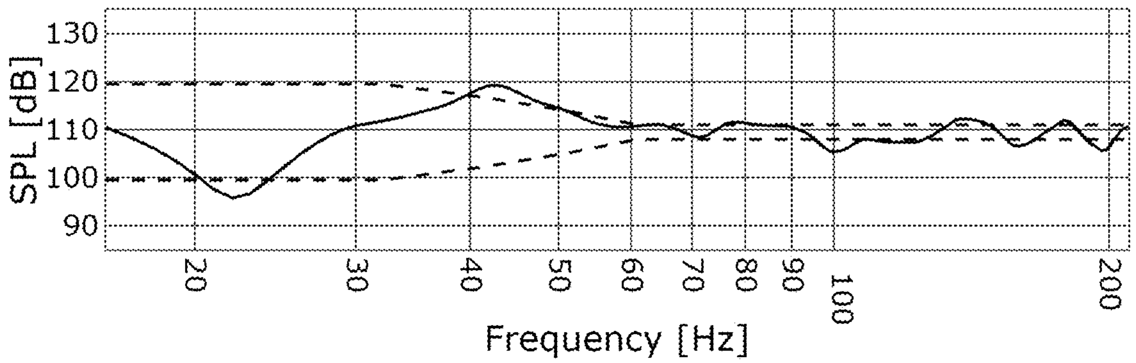
FIG. 4B shows the low-frequency response.

These limits are set to ±1.5 dB in the mid-frequency range for treated rooms, and ±3 dB for untreated rooms, expanding to ±10 dB for treated rooms and ±15 dB for untreated below 62 Hz to account for reduced human sensitivity to low-frequency variations, as established in "Perceptual thresholds for the effects of room modes as a function of modal decay" by Fazenda, Bruno & Stephenson, Matthew & Goldberg, Andrew in *The Journal of the Acoustical Society of America,* 2015, pp. 1088-1098. The resulting limits are shown in FIG. 4B. The metric calculates the error by measuring the squared deviation whenever the frequency response exceeds these limits. This squared error is then square-rooted, weighted by the square root of the frequency, and averaged to produce a final metric value. While this implementation uses tolerance-based error calculation, the invention's optimization methodology is adaptable to various measures of frequency response flatness, such as standard deviation from the mean response or other statistical variance calculations. The fundamental optimization process remains effective regardless of the specific mathematical approach used to quantify the frequency response characteristics, allowing for flexibility in metric implementation while maintaining the core benefits of the invention.

Figure 4C:
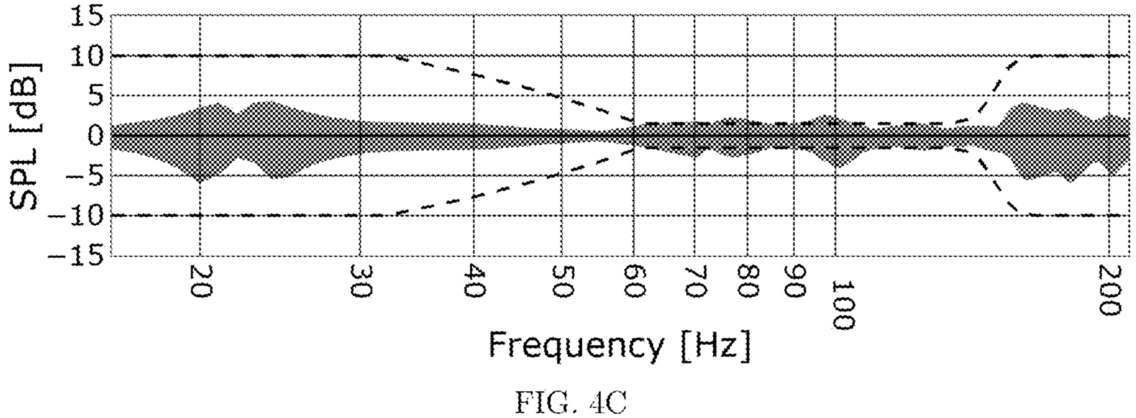
FIG. 4C shows the normalized spatial variation, both with the upper and lower recommended limits.

The invention further employs a spatial variation metric to evaluate sound distribution uniformity throughout the listening area. The metric establishes symmetric tolerance limits around the mean response: ±1.5 dB in mid-frequencies for treated rooms and ±3 dB for untreated, expanding to ±10 dB below 62 Hz and ±6 dB above the high-frequency cutoff (set to 150 Hz) for treated rooms and ±8 dB for untreated, as seen in FIG. 4C. A key distinction lies in how the metric analyzes the spatial distribution by calculating the 5th and 95th percentiles at each frequency, creating an envelope that represents the spread of response variations across the listening area. The error calculation follows the same squared deviation principle as the frequency response assessment, measuring violations whenever this envelope exceeds the established limits and computing a weighted average across frequencies. Similarly, this spatial analysis methodology is flexible and can accommodate alternative statistical approaches such as maximum-minimum ranges or standard deviations while maintaining the effectiveness of the optimization process.

Figure 5A:
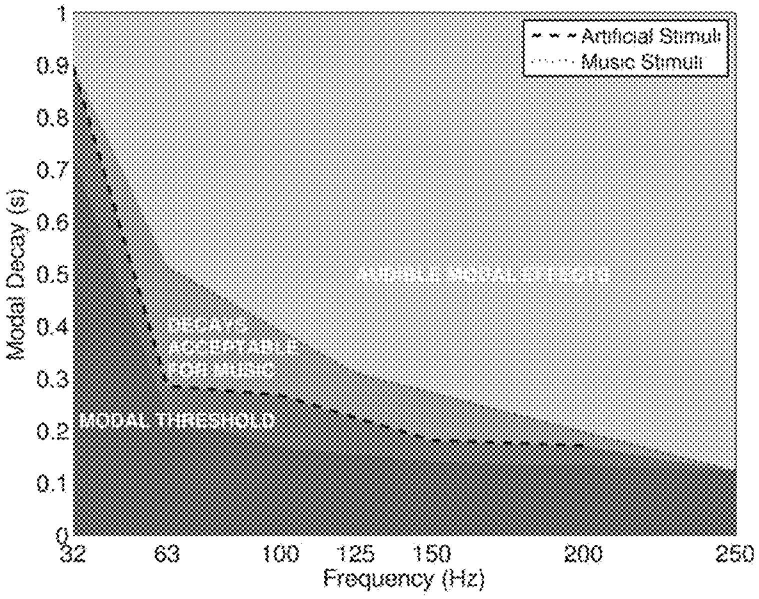
FIG. 5A illustrates audibility thresholds for low-frequency modal decay based on “Perceptual thresholds for the effects of room modes as a function of modal decay” by Fazenda, Bruno & Stephenson, Matthew & Goldberg, Andrew in *The Journal of the Acoustical Society of America,* 2015, pp. 1088-1098.
Figure 5B:
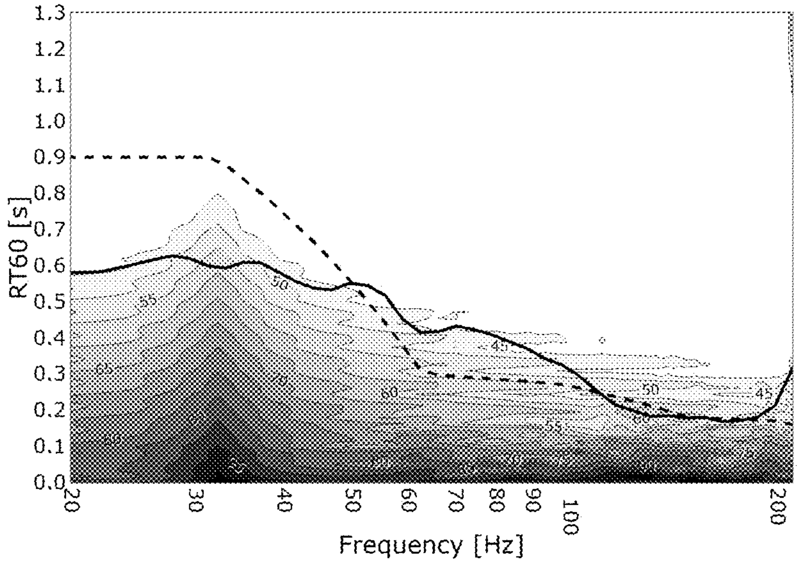
FIG. 5B shows a predicted RT60 decay curve derived from the low-frequency impulse response, where the solid line represents the *RT*60 *decay as described in RT*60 *Decay Graph by Mulcahy*, John in *Room EQ Wizard,* 2025, URL: https://www.roomeqwizard.com/help/help-en-GB/html/graph_rt60decay.html, the dashed line represents the lowest audibility threshold shown in FIG. 5A, and the shaded areas indicate the Short-time Fourier Transform (STFT) of the impulse response.

Second, the method evaluates temporal decay to ensure that the decay times at low frequencies are within the recommended thresholds to avoid audible modal effects. To address the potential non-linear behavior of room modes, the invention employs the RT60 Decay calculation method (*RT*60 *Decay Graph* by Mulcahy, John in *Room EQ Wizard,* 2025, URL: https://www.roomegwizard.com/help/help_en-GB/html/graph_rt60decay.html), shown as the solid line in FIG. 5. This calculation enables the reduction of room mode decay to levels below the perceptual threshold of modal decay times ("Perceptual thresholds for the effects of room modes as a function of modal decay" by Fazenda, Bruno & Stephenson, Matthew & Goldberg, Andrew in *The Journal of the Acoustical Society of America,* 2015, pp. 1088-1098), thereby eliminating audible ringing and coloration. The metric quantifies deviations from acceptable decay behavior by calculating the squared error whenever the measured RT60 Decay values exceed the perceptual threshold curve. These squared deviations are then square-rooted and weighted by the square root of the frequency, similar to the other metrics, to provide appropriate sensitivity to temporal anomalies. The final metric value is obtained by averaging these scaled deviations across all analyzed frequencies, where a value of zero indicates decay times within acceptable perceptual limits, and increasing values represent progressively more problematic modal behavior.

Figure 6A:
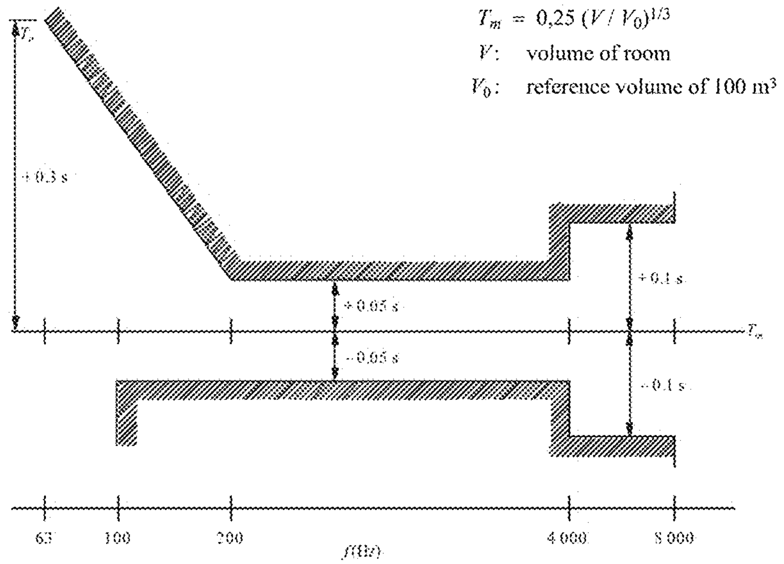
FIG. 6A illustrates recommended reverberation time limits according to standard-defined guidelines, as defined in ITU-R BS.1116-3 *—Methods for the subjectivem assessment of small impairments in audio systems* by Union, International Telecommunication, 2015.
Figure 6B:
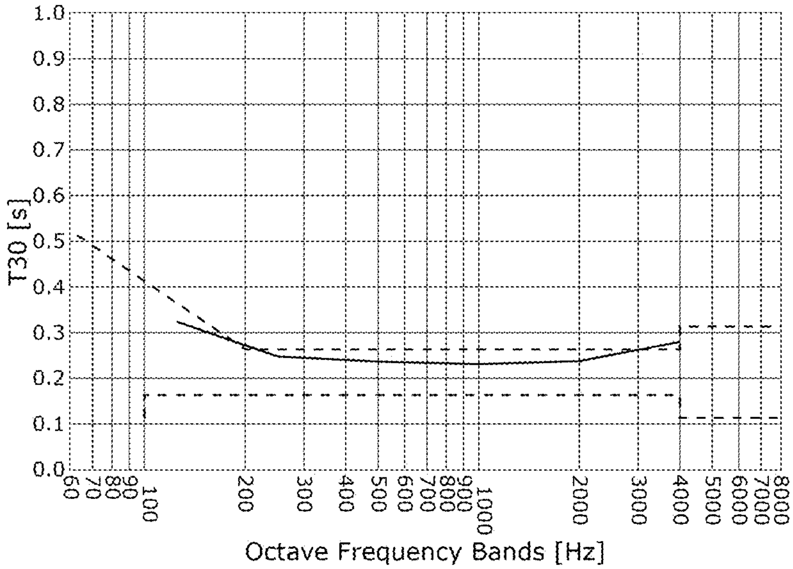
FIG. 6B displays predicted T30 reverberation time values as a solid line and recommended reverberation time limits for the corresponding room volume as dashed lines.

Third, the analysis extends to the mid-to-high-frequency spectrum and adjusts the traditional mid- and high-frequency reverberation time to comply with the standard recommended values as defined in ITU-R BS.1116-3 —*Methods for the subjective assessment of small impairments in audio systems* by Union, International Telecommunication, 2015, and as illustrated in FIG. 6. The reverberation time error metric quantifies how well a room's reverberation time aligns with the ITU standards across the frequency spectrum from 100 Hz to 8000 Hz. The calculation begins by establishing frequency-dependent upper and lower limits based on the room's volume, following ITU recommendations. The metric is computed by measuring deviations from these limits using a similar squared error approach: when the simulated reverberation time lies outside the recommended range, the squared difference between the measured value and the nearest limit is calculated, and the resulting value is square-rooted and averaged between all frequency bands. A final score of 0 represents perfect alignment with the recommendations (reverberation time within limits), and higher values indicate increasing deviation from the recommended range. This scoring method ensures that rooms are optimized to meet established acoustic standards.

Figure 7A:
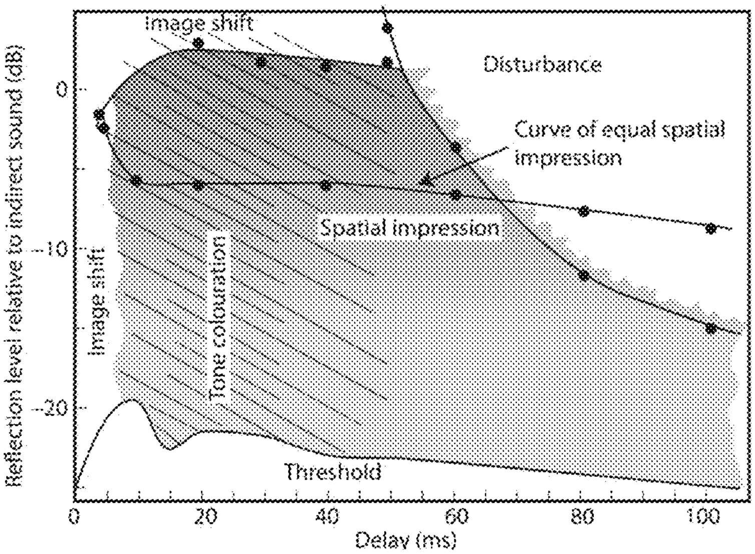
FIG. 7A illustrates audibility thresholds for early reflections based on *Auditorium acoustics and architectural design* by Barron, Michael, 2010, specifying the reflection arrival times associated with coloration or increased spatial impression.
Figure 7B:
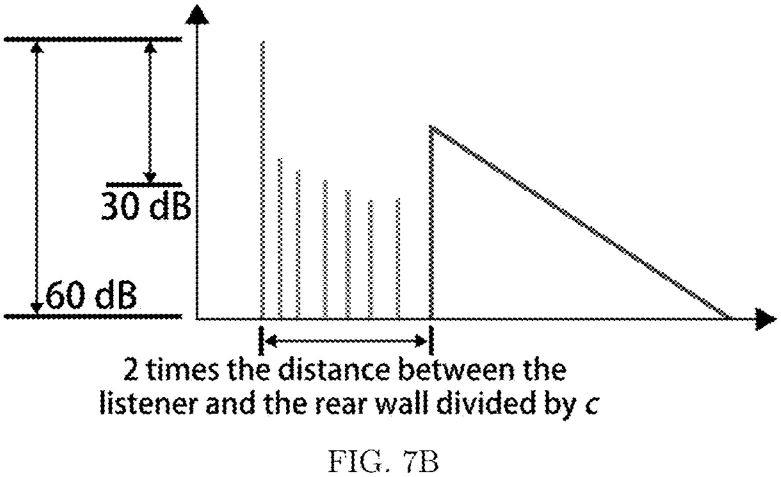
FIG. 7B defines the Reflection Free Zone (RFZ) using an arbitrary echogram.

Fourth and lastly, the invention creates a Reflection Free Zone with reflection levels below the thresholds of perception and a temporally dense diffuse-field zone with a minimum of strong isolated reflections, as illustrated in FIG. 7. This concept is intricately linked to the Initial Time Delay (ITD) as defined in *Concert halls and opera houses: music, acoustics, and architecture* by Beranek, Leo L., 2004. The ITD constitutes a crucial factor in determining the perceived acoustic size of a room. A room with a higher ITD will sound larger and less intimate, while a room with a lower ITD will be perceived as smaller and more intimate. Very early reflections are to be avoided or reduced below the audibility threshold to maintain tone coloration to a minimum and circumvent the deterioration of the original frequency spectrum. To achieve this, the invention utilizes a metric that aims to minimize the amount of first-order reflections arriving at the listening position within the early time window following the direct sound. To evaluate possible offending reflections, a ray tracing calculation is used, in which rays are emitted at regular angular intervals around the source, ensuring systematic coverage of all potential reflection paths. The rays that arrive at the listener with a single reflection are tracked, and their amplitudes are recorded relative to the direct sound path. These arriving reflections are used to create an echogram that represents the direct sound and the strong early reflections. The echogram is normalized by dividing all reflection amplitudes by the direct sound amplitude, creating a relative energy of the early reflections. The metric is derived from the sum of the energy of the normalized echogram, where smaller values will represent fewer early reflections present in the RFZ, providing a quantitative measure of reflection control effectiveness.

The evolution of control room design, from its early stages to the sophisticated environments of today, mirrors the audio industry's relentless quest for acoustic perfection. In the initial phases of control room design, the focus was on functionality, with less emphasis on acoustic precision. Early control rooms were based on rudimentary metrics and an uncertain understanding of what constituted ideal listening conditions. There was a prevailing belief that control rooms should mimic an average domestic room, assuming that this would lead to a sound that translated well across typical listening environments.

As stereo and multi-channel formats emerged, the inadequacies of traditional control rooms became more apparent. The industry recognized the need for spaces where the subtleties of sound could be accurately assessed and manipulated, leading to the development of two predominant design philosophies: the Live End Dead End (LEDE) approach, as defined in "The LEDE—Concept for the Control of Acoustic and Psychoacoustic Parameters in Recording Control Rooms" by Davis, Don & Davis, Chips in *Journal of the Audio Engineering Society,* 1980, pp. 585-595, and the Non-Environment approach, as defined in "Control room reverberation is unwanted noise" by Newell, Philip & Holland, Keith & Hidley, Tom in *Proceedings of the Institute of Acoustics,* 1994, pp. 365-73.

These competing philosophies offer distinct interpretations of what constitutes a neutral control room. The LEDE methodology creates a dynamic acoustic environment by segregating the room into a 'Live End,' rich in diffuse reflections and spatial cues, and a 'Dead End,' optimized for sound absorption and clarity. In contrast, the Non-Environment approach focuses on achieving an ultra-damped space through extensive broadband absorption, providing sufficient low-frequency control to address modal decays while approximating a semi-anechoic acoustic environment above 1 kHz. Each approach addresses the challenges of sound reflection and reverberation through different means, representing important evolutionary steps in control room design.

While these design philosophies established fundamental principles for control room acoustics, both LEDE and Non-Environment approaches often encountered challenges in precisely controlling low-frequency modal behavior. Though they acknowledged the importance of room geometry, neither provided rigorous mathematical frameworks for optimizing room geometry to address specific modal resonances. As practitioners implemented these approaches, persistent low-frequency issues revealed the need for more precise geometric optimization techniques focused specifically on modal distribution. This led to the development of dimensional analysis methodologies that approached room design from a more quantitative perspective.

A traditional approach to controlling the low-frequency room modes is to determine the optimal dimensional ratios using a solution to the wave equation for a cuboid room, which assumes all modes are excited and all modes are heard. Equation ( ) determines the location of the modal frequencies, $f_i$, but not their relative energies, where l, w, and h are the room's length, width, and height, n are integers representing the order of the mode in each direction, and c is the speed of sound.

$$f_i = \frac{c}{2}\sqrt{\left(\frac{n_x}{l}\right)^2 + \left(\frac{n_y}{w}\right)^2 + \left(\frac{n_z}{h}\right)^2} \quad (1)$$

Figure 17:
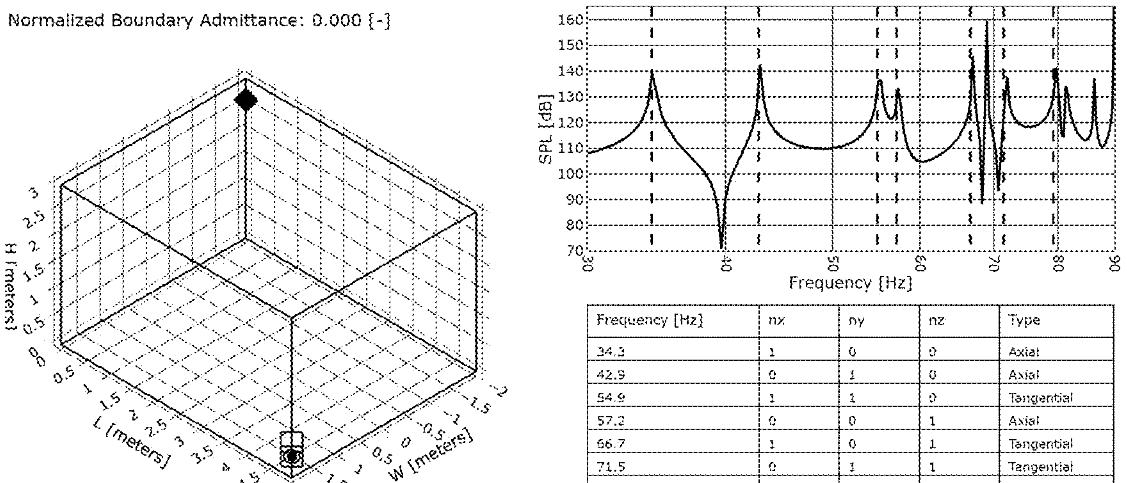
FIG. 17 shows images illustrating the room modes and low-frequency response of a cuboid room with rigid walls, where the source and receiver are positioned at opposite diagonal corners.

The dimensional analysis of cuboid rooms forms the foundation of many low-frequency optimization methodologies. While equation ( ) reveals the frequencies of discrete room modes, it provides little information about their amplitudes, which depend critically on source and listener positions. To illustrate this, consider three scenarios of increasing complexity. First, in a cuboid room with rigid walls (FIG. 17), with a speaker in one corner and a microphone in the opposite diagonal corner, all modes are simultaneously excited and heard. The simulated frequency response shows peaks perfectly aligned with frequencies predicted by the equation.

Introducing compliant walls with areal admittance of 0.02 (FIG. 18) significantly alters the amplitude of peaks and dips in the response, though without changing the phase. Further, repositioning the source to the front third of the room and the receiver to a typical listening position at 30 degrees (FIG. 19) creates another dramatic change in frequency response, demonstrating the critical relationship between perceived modal behavior and the positions of both source and listener.

An initial attempt to address iterative acoustical room design at low frequencies in cuboid spaces using an image source method was published by Cox and D'Antonio with their Room Sizer software. This program optimized dimensional room ratios to achieve the most even modal distribution. Cox and D'Antonio also published work describing a program called Room Optimizer to iteratively optimize the location of loudspeakers and listeners in cuboid rooms. While these tools represented significant advances in computational room acoustics, they were limited to rectangular spaces and simplified acoustic models. Neither approach was sufficient to iteratively determine the optimal acoustical design over the entire audio spectrum or address the complexities of non-cuboid rooms with varied acoustic treatments.

Figure 9:
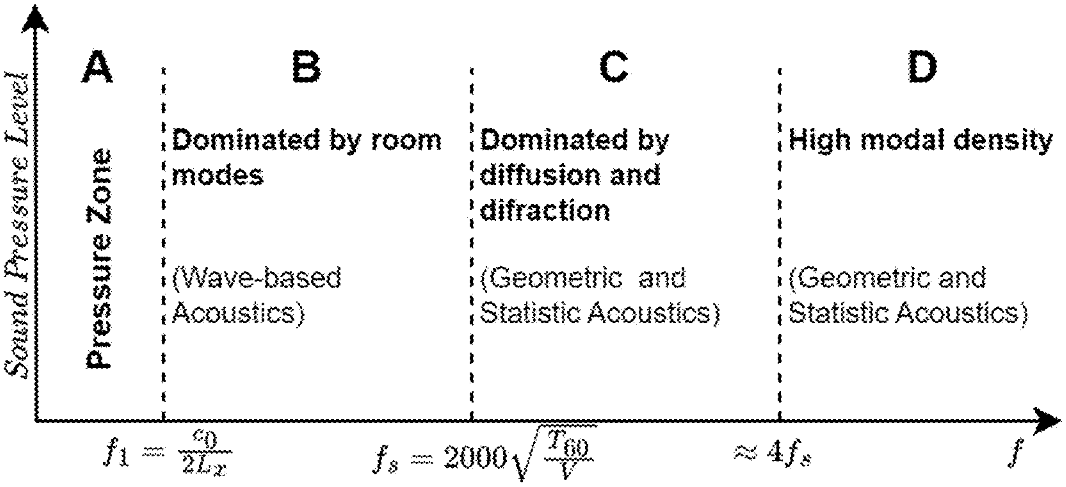
FIG. 9 shows the frequency range of the audible spectrum and defines the computer modeling techniques used by the invention to accurately predict room acoustics performance metrics.

Building upon these foundational approaches by Cox and D'Antonio, the present invention addresses the fundamental limitations of traditional methods. While previous tools relied on simplified assumptions about source and listener positions that rarely reflect real-world configurations, the invention provides a comprehensive solution that accounts for the complex acoustic behavior across different frequency ranges. A critical listening room's frequency response is characterized by distinct regions: the modal region below a transition frequency (the Schroeder frequency), where isolated modes are modeled using wave acoustics, and the higher frequency region where modal density increases significantly, requiring geometrical acoustics approaches. FIG. 9 illustrates how sound behavior changes across these regions of the audible spectrum.

The pressure zone exists in the first region, which occurs below the room's first resonance, followed by the normal modes zone, where wave-based acoustics and surface impedances are utilized for greater accuracy at low frequencies. Beyond that lie regions dominated by diffusion, reflections, and diffraction, where the method shifts to geometrical acoustics by using techniques like ray tracing, which simulates sound propagation by tracking individual sound rays through the space while accounting for reflections, scattering, and absorption at surfaces, and the image source model, which models sound propagation by tracking reflection paths through virtual "image" sources that mirror the actual sound source across reflective surfaces, instead of wave-based acoustics. The present invention teaches the use of a combination of wave acoustics and geometrical acoustics to model the audible spectrum.

Figure 10A:
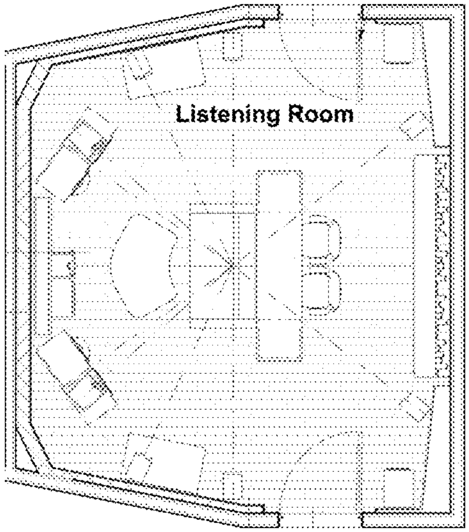
FIG. 10 shows the architectural drawings of a listening room and its corresponding 3D model. The floorplan and sections, depicted in FIG. 10A and FIG. 10B, are used to extract dimensions and spatial locations for all acoustical elements, which are illustrated in FIG. 10C within the 3D room model used to practice the invention.
Figure 10B:
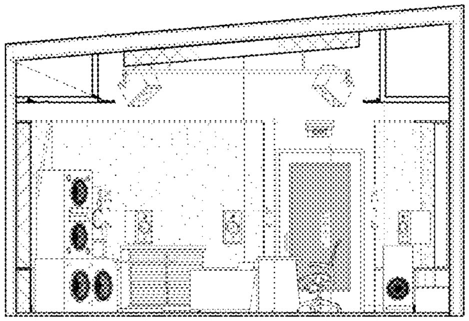
Figure 10C:
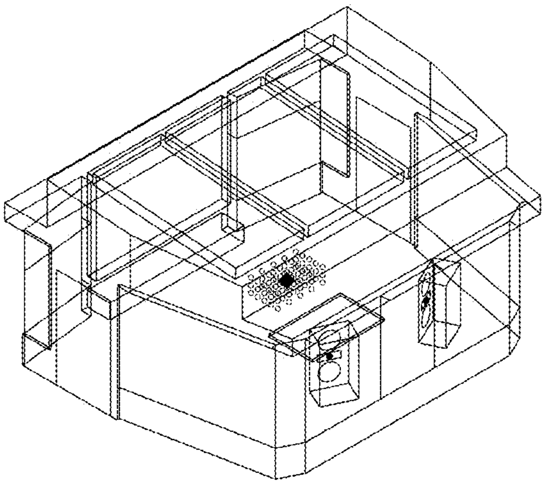

The optimization process begins with creating a detailed geometric model of the room with precisely defined vertices and plane surfaces, as illustrated in FIG. 10. For wave-based calculations, this geometry must be converted into appropriate computational elements through a meshing process, wherein boundary surfaces and the interior volume are discretized for the Finite Element Method (FEM) analysis, as depicted in FIG. 11.

The Finite Element Method represents the first core simulation technique employed by the invention. This method, illustrated in FIG. 11, provides robust acoustic predictions, particularly at low frequencies where modal behavior dominates. FEM constitutes a numerical method that computes acoustic fields within enclosed spaces through strategic spatial discretization. For the room acoustic application in the invention, FEM effectively solves the Helmholtz Equation, $$\nabla\tilde{p}+k\tilde{p}=-j\rho_0\omega\tilde{q} \qquad (2)$$

where $\rho_0$ represents the air density measured in kg/m$^3$; $\tilde{q}$ indicates the sound source volume velocity in m$^3$/s; $\omega=2\pi f$ denotes angular frequency in rad/s; $k=\omega/c$ specifies the wave number magnitude in rad/m; and c corresponds to sound propagation velocity in m/s. Through application of the integral formulation or Galerkin Method, Equation (2) undergoes transformation whereby the discretized elements yield a system of algebraic equations with finite degrees of freedom, solvable numerically as shown in Equation ( ). This mathematical formulation conceptualizes the room as a bounded domain, subdivided into a mesh comprising of elements with defined mass, damping, and stiffness characteristics. From this theoretical framework, the following matrix formulation emerges:

$$[K+j\omega C-\omega^2 M]\{\tilde{P}\}=-j\omega\{\tilde{q}\} \qquad (3)$$

where K and M are the global stiffness and mass matrices, and C is the global admittance (damping); The complex vectors $\{\tilde{P}\}$ and $\{\tilde{q}\}$ represent the sound pressures and volume velocities of the sound source at all mesh nodes.

Figure 11A:
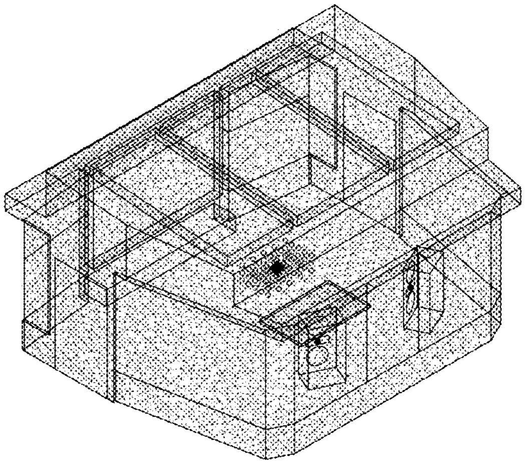
FIG. 11A and FIG. 11B illustrate the meshing of the boundary surface and the interior volume, while FIG. 11C and FIG. 11D demonstrate the evaluation of sound pressure at any point or boundary within the room using the wave-based calculation method.
Figure 11B:
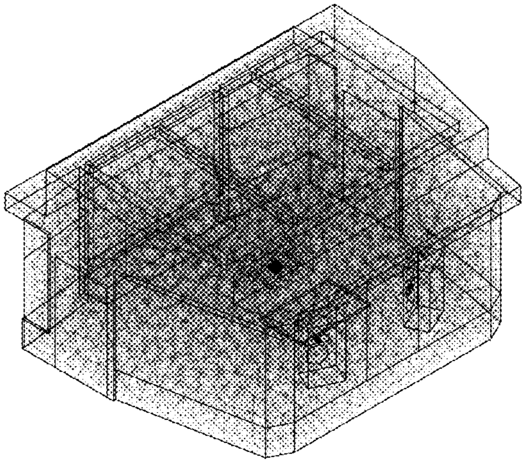
Figure 11C:
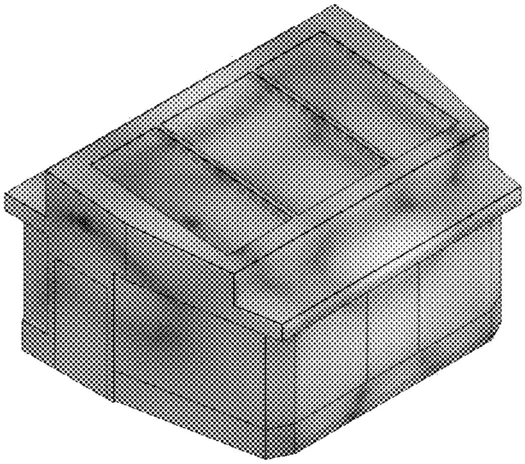
FIG. 11 shows images related to the application of the Finite Element Method (FEM).

Practicing FEM requires several critical inputs: precise source and receiver positions, a detailed three-dimensional room model, accurate source directivity data, and a defined maximum frequency of analysis that determines the required mesh density. The method divides both room surfaces and the enclosed air volume into discrete elements, as shown in FIG. 11A and FIG. 11B. Crucially, the invention accounts for the complex surface impedances of all room boundaries and acoustic treatments, as well as the properties of the enclosed fluid medium—typically air, but sometimes including acoustic features such as suspended absorptive elements common in critical listening room designs.

Figure 11D:
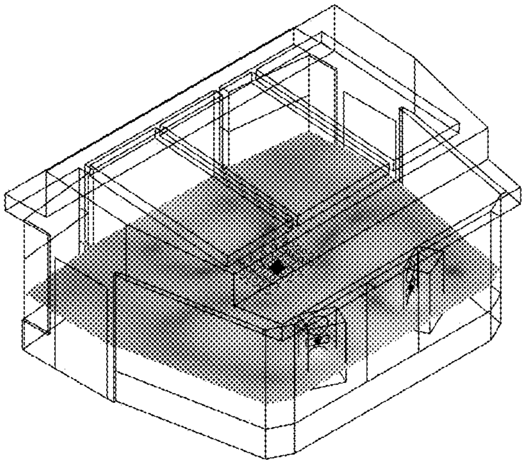

Upon completion of the meshing process, the invention calculates pressure distribution across all mesh elements, enabling pressure interpolation at any arbitrary point within the analyzed volume, as demonstrated in FIG. 11D. This calculation yields a wave-based, frequency-domain solution from which time-domain responses can be derived through inverse Fourier transformation with appropriate signal processing techniques. While computationally intensive due to the required matrix inversions—particularly as analysis frequencies increase—this method delivers exceptional precision at low frequencies. This precision stems from the method's incorporation of complex surface impedances, which accurately account for the phase changes occurring at boundaries—a critical factor for correctly modeling low-frequency acoustic phenomena.

Figure 13A:
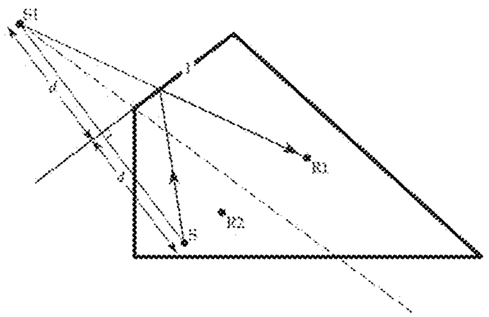
FIG. 13A and FIG. 13B illustrate first- and second-order reflections, respectively, from the source to a receiver in an arbitrarily shaped room.
Figure 13B:
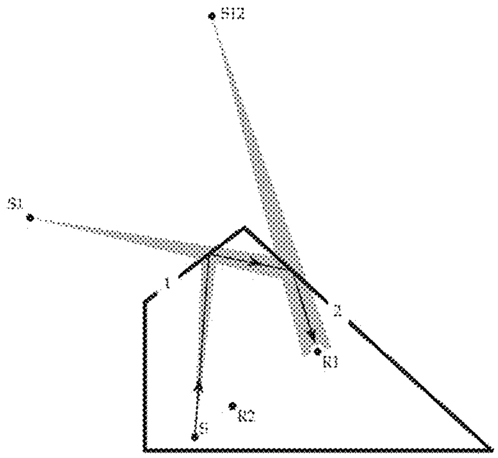

The Image Source Method constitutes the second simulation technique utilized by the invention. Illustrated in FIG. 13, this method was previously employed in earlier room optimization programs such as Room Sizer and Room Optimizer. The method requires as input the positions of both source and receiver, detailed room surface definitions, and can incorporate surface absorption coefficients and source directivity characteristics. The fundamental principle resembles the physical phenomenon of mirror reflection, wherein each room surface acts as a mirror, creating virtual sources whose direct paths to the receiver represent the actual reflection paths in the physical room. FIG. 13A illustrates first-order reflections (involving a single reflecting surface), while FIG. 13B demonstrates second-order reflections (involving two reflecting surfaces).

Figure 1B:
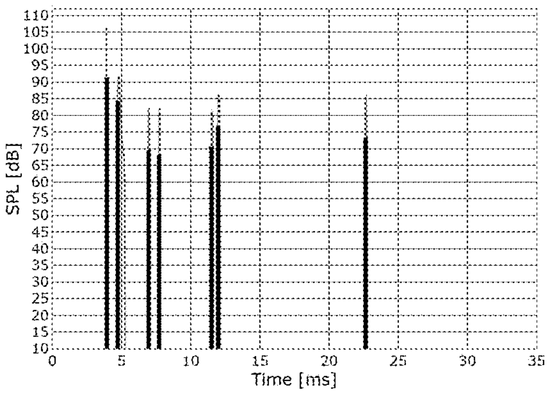
FIG. 1B shows a reflectogram of specular reflections, and FIG. 1C and FIG. 1D respectively show the low-frequency response and spatial variation at the receiving position.
Figure 1C:
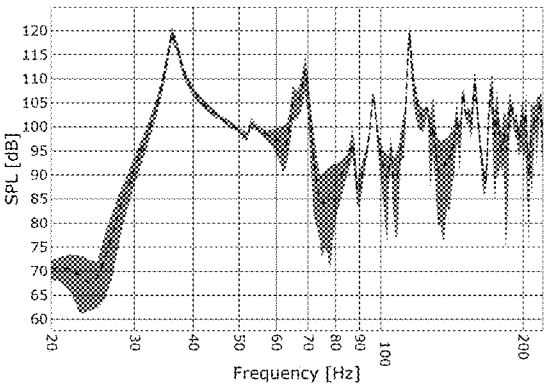
FIG. 1 shows results obtained from practicing the room optimization method.
Figure 1D:
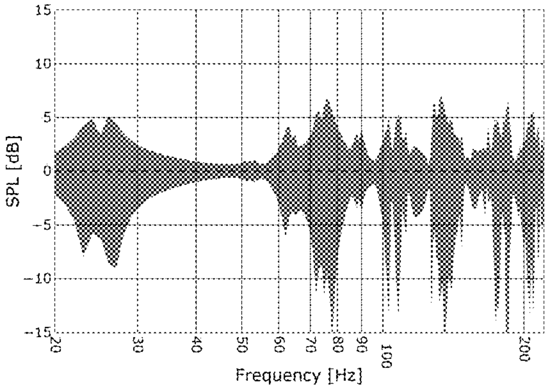

The primary advantage of the Image Source Method lies in its computational efficiency, particularly for regular cuboid rooms. For non-cuboid geometries, the computational complexity increases due to the requisite visibility tests that determine whether reflection paths can reach the receiver without obstruction. Despite this increased complexity, the method maintains excellent accuracy for higher-order reflections in empty rooms, including those with non-cuboid geometries. However, the method exhibits diminished precision at low frequencies when applied to rooms with acoustic treatments or compliant boundaries, as it does not account for complex impedance effects, phase changes, or acoustic scattering phenomena. Nevertheless, the method excels at precisely identifying reflection points and paths. The invention utilizes this capability to generate a reflectogram as illustrated in FIG. 1B, which depicts the timing and amplitude of each reflection while accounting for surface absorption and source directivity. The reflectogram enables critical evaluation of early reflections arriving within the Reflection Free Zone and assessing their attenuation levels.

Stochastic Ray Tracing represents the third simulation technique employed by the invention. As depicted in FIG. 12, this widely employed acoustic modeling approach originated in optical physics and has been adapted for acoustic analysis, particularly for larger spaces such as concert halls. The method involves projecting numerous rays from the sound source, which reflect throughout the room according to principles of acoustic reflection and scattering. The invention tracks and records the number of rays that reach designated listening positions, the directions from which they arrive, and their associated energies. FIG. 12C illustrates this principle with a ray that undergoes multiple reflections before reaching a receiver. This analysis yields an estimated impulse response at the receiving position, providing a time-domain representation of the room's acoustic behavior. Implementation requires comprehensive inputs, including detailed room geometry, surface absorption and scattering coefficients, and accurate source directivity characteristics.

Figure 12A:
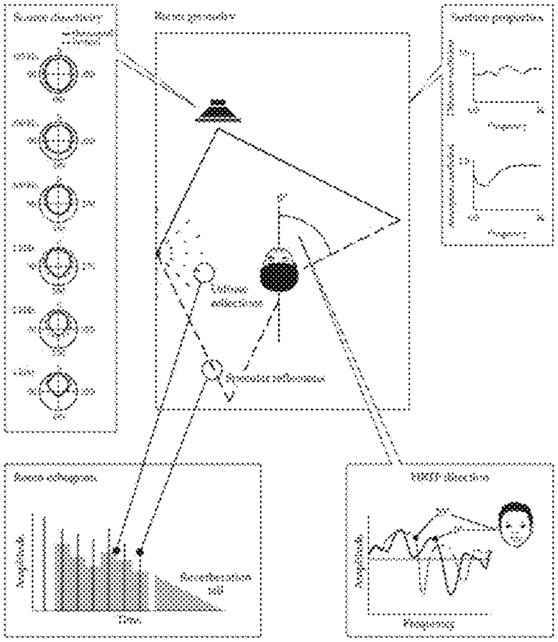
FIG. 12A depicts the simulation of a room echogram using the geometrical acoustics method, including descriptions of the room geometry, surface properties, source directivity, and the receiver's Head-Related Transfer Function (HRTF).
Figure 12B:
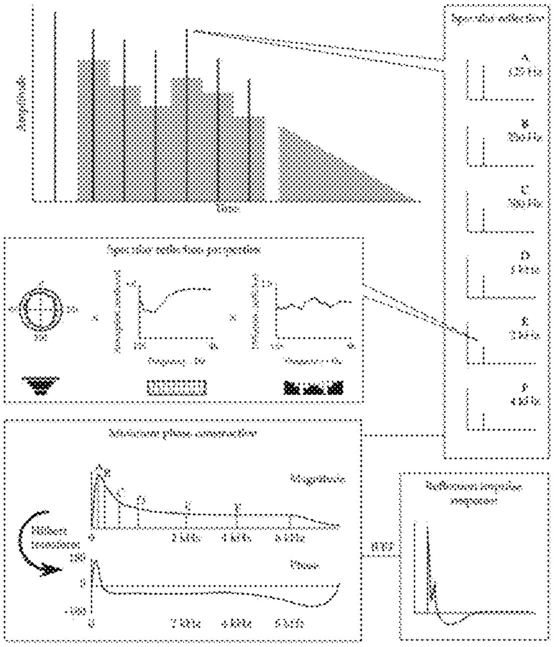
FIG. 12B illustrates the minimum phase transfer function construction technique used to convert an echogram into an impulse response.
Figure 12C:
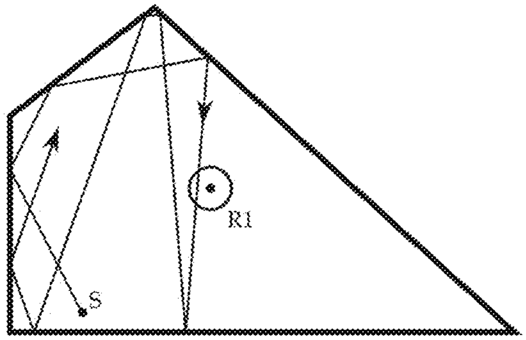
FIG. 12C demonstrates a ray tracing example, showing an emitted ray from a source entering the detection area of the receiver cell after three specular reflections.

The ray tracing implementation functions analogously to the Image Source Method in generating a time-dependent echogram across multiple frequency bands, as shown in FIG. 12A. These frequency-dependent echograms can be combined to construct a broadband representation of the room's acoustic characteristics. Through appropriate signal processing techniques such as minimum phase reconstruction illustrated in FIG. 12B, the invention transforms these echograms into impulse responses, with artifacts that may be introduced during the reconstruction process. The echograms also facilitate the estimation of critical acoustic parameters such as reverberation time. An important limitation of this method is its reduced effectiveness in smaller rooms, particularly at lower frequencies, as it does not fully capture phase relationships due to the omission of complex admittance factors. Further, the common proximity of sources and receivers to room boundaries in smaller spaces further diminishes the method's precision at lower frequencies.

Figure 14:
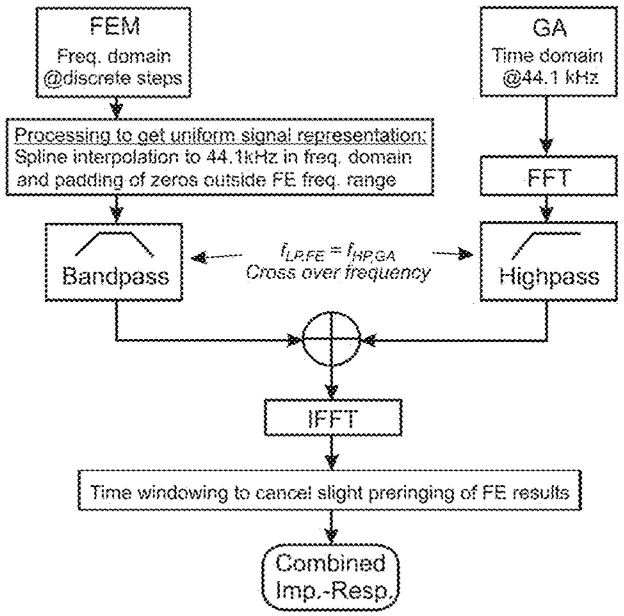
FIG. 14 shows a block diagram of the combination method used for integrating wave-based and geometrical acoustics simulations.
Figure 15:
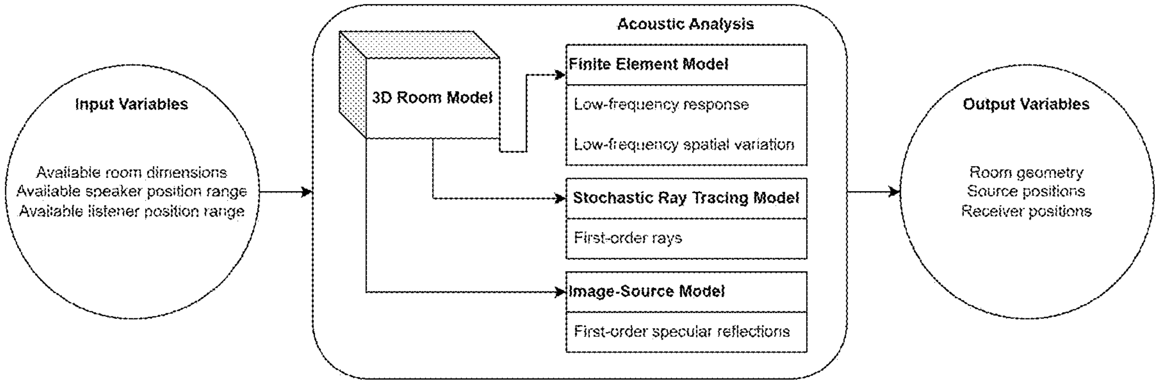
FIG. 15 shows a flow chart of a sequence of steps undertaken in practicing the room optimization method.
Figure 16:
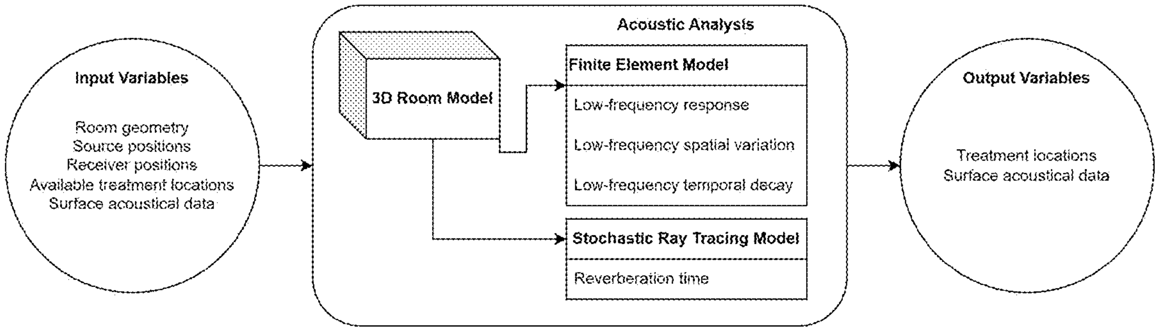
FIG. 16 shows a flow chart of a sequence of steps undertaken in practicing the treatment optimization method.

The invention synthesizes these complementary simulation techniques through a hybrid approach, as illustrated in FIG. 14. The frequency-domain solution obtained from FEM analysis at low frequencies undergoes filtering and transformation into the time domain. Concurrently, the time-domain response derived from ray tracing is filtered and combined with the FEM-derived response. This integration produces a comprehensive full-band frequency response spanning the entire audible spectrum, with the crossover frequency between methodologies adjustable according to specific objectives and computational constraints. This combined approach represents the state-of-the-art in room acoustic simulation, enabling accurate prediction across the full frequency range relevant to critical listening environments.

Figure 8:
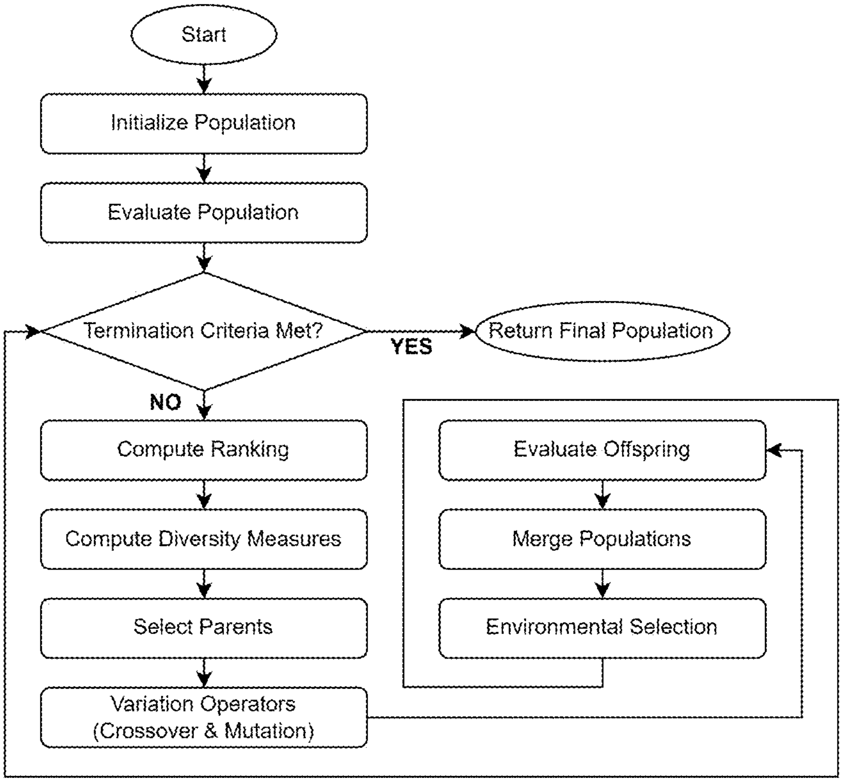
FIG. 8 shows a flow chart of the sequence of steps undertaken by the multi-objective optimization algorithms used while practicing the present invention.

The present invention utilizes a multi-objective search engine to simultaneously optimize multiple objective measures, wherein no metric is optimized at the expense of another, resulting in an optimal compromise solution. FIG. 8 illustrates a flow chart describing the operation of such evolutionary optimization algorithms.

The algorithm determines if termination criteria have been met (such as reaching a maximum number of iterations or achieving satisfactory convergence). If the criteria are met, the final population containing optimal solutions is returned. Otherwise, the algorithm proceeds by computing ranking based on dominance principles and calculating diversity measures to maintain population variety. Parents are selected based on these metrics, and variation operators, including crossover and mutation, are applied to generate offspring. These offspring are evaluated, merged with the existing population, and subjected to environmental selection to maintain population size. This cycle repeats until termination criteria are satisfied, ensuring a diverse set of optimized solutions representing the best trade-offs between competing objectives.

The optimization methods enable precise evaluation of numerous room parameters simultaneously, distinguishing optimal from suboptimal acoustic solutions. This approach is particularly valuable for projects with many variables, such as optimizing non-cuboid rooms and acoustic treatments, where achieving satisfactory results for multiple simultaneous parameters through manual iteration would be prohibitively time-consuming. The fine-tuned optimization engine automatically generates and evaluates numerous configurations, efficiently searching through variables and parameters to identify optimal solutions.

The multi-objective room optimization method requires the following inputs for calculation:

- Characterization (specifications) of the given loudspeaker system;
- Determination of the complex impedance of the room's boundaries;
- Determination of the accessible volume for the room's geometry;
- Locating the accessible area for the loudspeakers;
- Locating the accessible area for the listeners.

The invention processes these inputs by iteratively evaluating the modal (low-frequency) response, spatial variation, and early reflections using the multi-objective search engine until an acceptable result is achieved.

Above the transition frequency, the invention utilizes ray tracing, FIG. 12, and the Image Source Model, FIG. 13.

The multi-objective room optimization method simultaneously optimizes room geometry along with the positions of listeners and sound sources. This approach optimizes the low-frequency response while minimizing spatial variations around the listening area and reducing early reflections arriving in the Reflection Free Zone, as illustrated in FIG. 1. The method accounts for all aspects of room design, including wall positions, distances between listener and speakers, source directivity, and angles. For rooms of moderate complexity, thousands of simulations with various constraints are typically required. The optimizer ensures comprehensive exploration of the solution space, evaluating millions of potential configurations that would be impractical to assess manually. When architectural constraints permit modification of room geometry, this optimization stage establishes an optimal foundation for subsequent acoustic treatment.

The present invention further provides a treatment optimization method which may be implemented either following room geometry optimization or as a standalone solution when room dimensions and configurations are predetermined or immutable. This flexibility is particularly valuable in retrofit scenarios or when working within existing architectural constraints where modification of the physical space is not possible.

The invention incorporates a multi-objective treatment optimization method, as illustrated in FIG. 2. This advanced optimization method simultaneously accounts for four different metrics: low-frequency response, spatial variation, temporal decay at low frequencies, and reverberation times at mid and high frequencies.

Figure 2A:
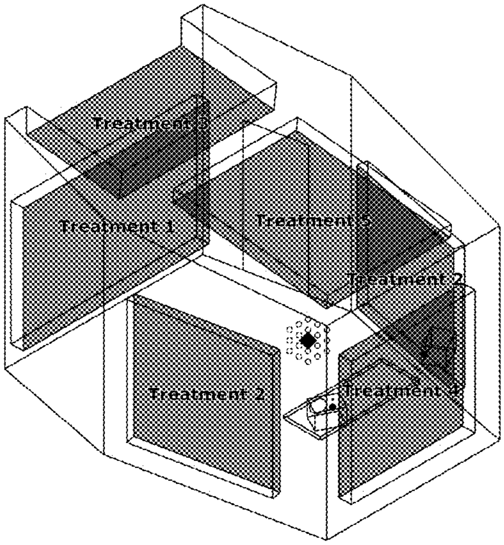
FIG. 2A shows the room with the five unique acoustic treatment locations, labeled as Treatment 1 through Treatment 5, representing the available treatment locations in the room with multiple available treatment options each.
Figure 2B:
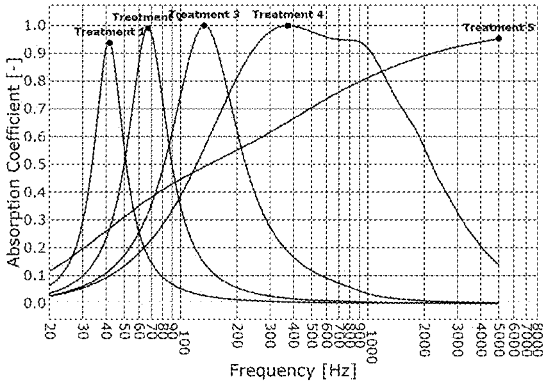
FIG. 2B shows the absorption coefficient curves for the selected option of each of the five available treatment locations.
Figure 2C:
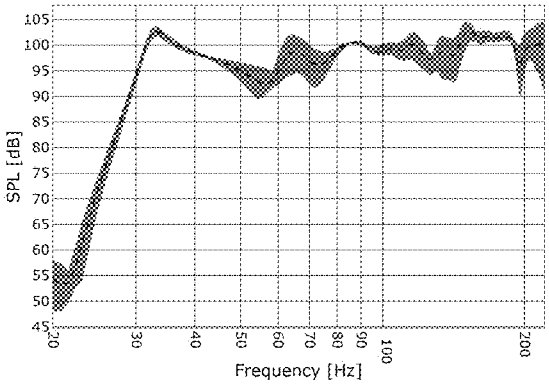
FIG. 2C and FIG. 2D respectively show the low-frequency response and spatial variation at the receiving position, and FIG. 2E and FIG. 2F respectively show the low-frequency temporal decay and reverberation time.
Figure 2D:
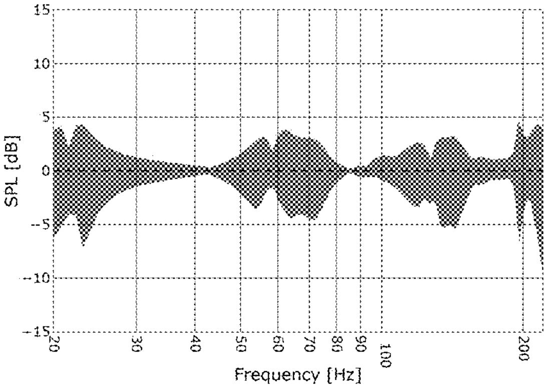
Figure 2E:
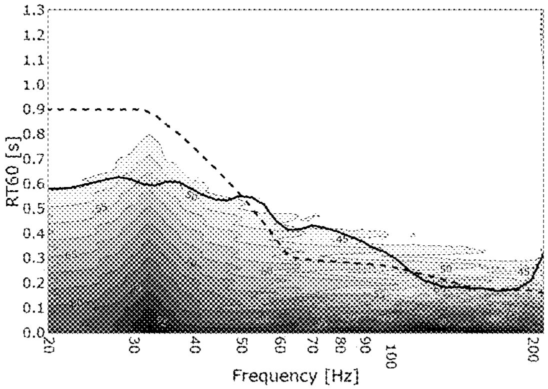
FIG. 2 shows results obtained from practicing the treatment optimization method.
Figure 2F:
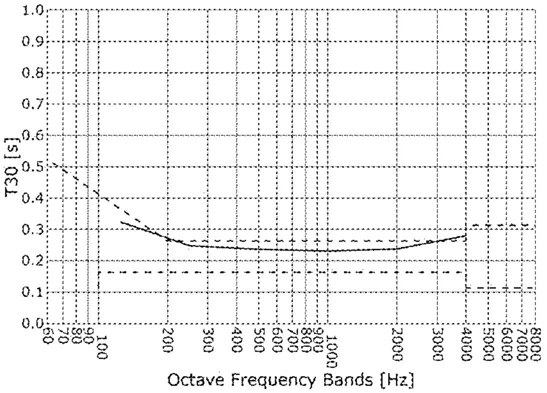

The method's efficacy stems from its ability to optimize comprehensive treatment schemes across multiple surfaces. In typical applications, multiple treatment areas exist within a room, each with numerous possible treatment configurations depending on available depth and desired aesthetic characteristics. FIG. 2B illustrates the absorption curves for unique acoustic treatment locations in a room, each representing one of many possible configurations. The combinatorial nature of these treatment choices across multiple room surfaces creates a vast solution space containing millions of possible configurations that would be infeasible to evaluate through manual methods.

When both optimization methods are employed sequentially, the multi-objective treatment optimization method is applied after determining optimal geometry and speaker/listening positions. However, in scenarios with fixed room geometry, the treatment optimization can be applied directly to achieve optimal acoustic performance within existing constraints. In either implementation scenario, FIG. 2 shows the iterative optimization process as the program evaluates treatment configurations.

The treatment optimizer method focuses primarily on optimizing acoustic treatments through precise prediction of acoustic behavior. The invention incorporates the Transfer Matrix Method (TMM), as defined in "Comparison of measurement and prediction for acoustical treatments designed with Transfer Matrix Models" by Petrolli, Rinaldi & Zorzo Leão, Artur & D'Antonio, Peter in *Euronoise,* 2021, to calculate absorption characteristics and surface impedance for a comprehensive range of multilayer treatments. In the TMM, each layer in a treatment is represented by a matrix that relates sound pressure and particle velocity on both sides of the layer. These matrices are then combined to form a complete system that models the entire stack of materials. This allows accurate simulation of how sound waves are absorbed, reflected, or transmitted through the structure. This methodology extends beyond reliance on manufacturer data, enabling accurate modeling of complex structures, including perforated panels, slotted resonators, and various insulation configurations. This precision in treatment modeling is essential for accurately predicting room acoustic performance across the full audible spectrum, particularly in environments requiring exacting control of modal behavior and frequency response.

Proof of Concept Examples

To demonstrate the practical efficacy of the invention, four representative application examples are presented: two implementing the room optimization method and two implementing the treatment optimization method. These examples illustrate the versatility of the optimization approaches across various room configurations commonly encountered in critical listening environments for stereo sound reproduction.

The first example demonstrates the application of the room optimization method to a cuboid room with no acoustic treatments. This scenario represents the foundational case for critical listening environments, where only the room dimensions and positioning variables are optimized. The optimization parameters include room width, length, and height, along with the positions of a stereo loudspeaker pair and a single listening position. In this cuboid configuration, the number of first-order reflections remains constant regardless of geometry, so reflections are not evaluated for this case.

For the example cuboid room, a volume constraint of between 40 and 180 cubic meters was established. The primary optimization objectives focus on two key metrics: low-frequency response and spatial variation around the listening position. The low-frequency response is evaluated through narrowband analysis at the listening position, ensuring a controlled response. Spatial variation is assessed by measuring the frequency response at multiple points within the listening zone. These objectives are achieved through the careful optimization of room dimensions and the placement of loudspeakers and listening positions, as demonstrated in this example.

Figure 20A:
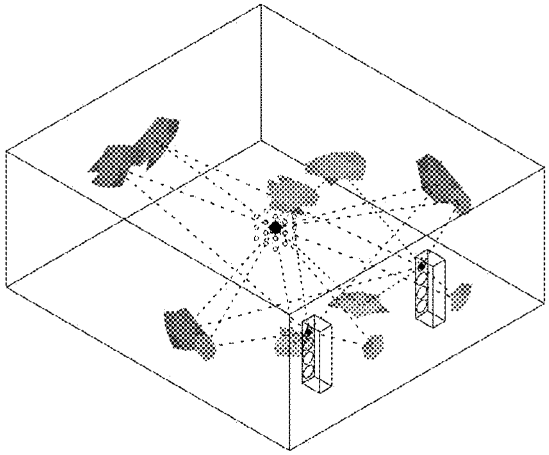
Figure 21A:
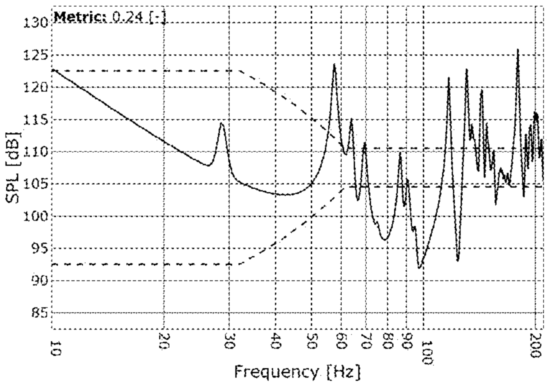
Figure 22A:
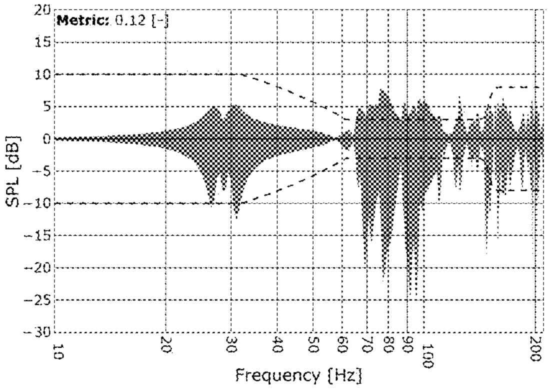

The worst-performing configuration, illustrated in FIG. 20A, demonstrates the acoustic challenges inherent in a non-optimal cuboid room. Without considering acoustic principles or dimensional ratios, the room exhibits significant modal resonances that create pronounced peaks and nulls in the low-frequency response, resulting in a low-frequency response metric value of 0.24, as illustrated in FIG. 21A. The spatial variation metric value of 0.12 further illustrates the room's poor performance, with the gray-shaded envelope representing spatial variations across the listening area frequently extending beyond the dashed tolerance limits, particularly in the critical 70 to 100 Hz region where variations exceed 20 dB, as demonstrated in FIG. 22A. This configuration, chosen without any acoustic optimization or consideration of room ratios, serves as a baseline to demonstrate the improvements achievable through the optimization process.

Figure 20B:
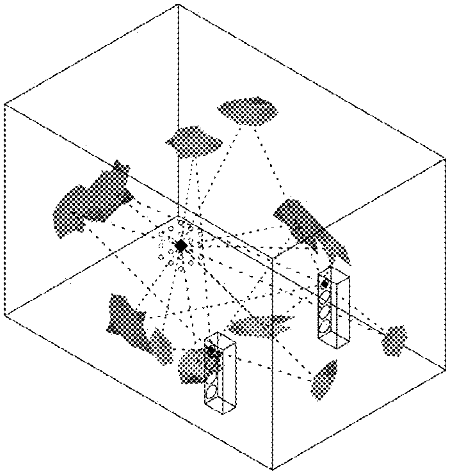
FIG. 20B shows a room with geometry optimized by the invention.
Figure 21B:
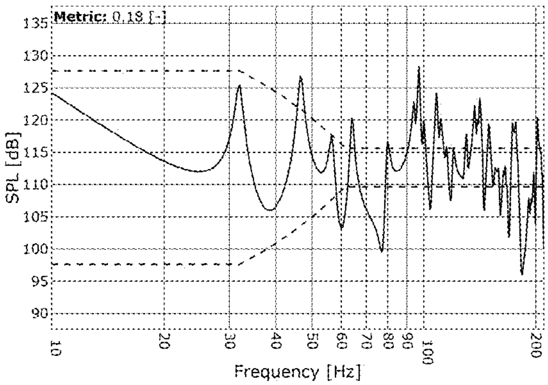
FIG. 21B shows the frequency response for a cuboid room optimized with the room optimization method.
Figure 22B:
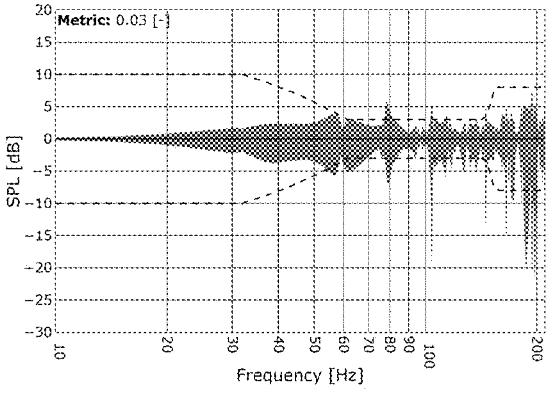
FIG. 22B shows the spatial variation for a cuboid room optimized with the method.

The optimized room configuration, shown in FIG. 20B, demonstrates the effectiveness of the invention's methodology, achieving significantly improved metric values. The optimized geometry avoids problematic modal coupling while maintaining practical architectural proportions. Strategic positioning of loudspeakers and listening positions minimizes modal excitation and perception issues. The resultant low-frequency response, illustrated in FIG. 21B, exhibits a significantly flatter frequency characteristic with controlled modal resonances. The low-frequency response metric improves to 0.18, reflecting a more controlled frequency response that better maintains compliance with the tolerance limits indicated by the dashed lines. Spatial variation across the listening area, as depicted in FIG. 22B, is reduced to within acceptable limits, ensuring consistent sound reproduction throughout the listening position. The spatial variation metric shows dramatic improvement to 0.03, with the gray-shaded envelope of spatial variations now contained mainly within the frequency-dependent tolerance limits. This example demonstrates that even without acoustic treatments, substantial improvements in acoustic performance can be achieved in cuboid rooms through precise dimensional optimization and strategic placement of sound sources and receivers.

This first example demonstrates the significant acoustic benefits achievable through geometry optimization alone, even without applying acoustic treatments. The computational approach utilized by the invention efficiently evaluates thousands of potential solutions against multiple objective criteria simultaneously, a process that would be impractical through manual methods. The optimization produces measurable improvements in low-frequency response and spatial variation that would be difficult to achieve through traditional trial-and-error approaches. This efficiency is particularly valuable in the initial design phases of critical listening spaces, where fundamental decisions about room proportions have long-lasting implications for the acoustic environment. By establishing optimal dimensional relationships and positioning strategies before considering treatments, the invention creates a solid foundation for subsequent acoustic refinements, potentially reducing the extent and cost of necessary acoustic treatments.

The second example extends the room optimization method to a non-cuboid room featuring angled walls and ceiling. This scenario introduces additional geometric complexity that significantly impacts modal behavior and reflection patterns. The optimization parameters include the angles and positions of non-parallel walls and ceiling, along with speaker and listening positions. This case demonstrates how intentional geometric irregularity can be leveraged to achieve superior acoustic performance, particularly in controlling early reflections and low-frequency modal distribution.

For this non-cuboid configuration, the optimization framework defines coordinate adjustment ranges for each room vertex point, with the number of vertices defining the room geometry established beforehand. Unlike the previous example's fixed orthogonal boundaries, this approach permits each vertex to move within specified delta X, Y, and Z coordinate ranges, creating non-parallel surfaces while maintaining architectural integrity. This geometric flexibility introduces additional optimization variables that significantly impact both modal behavior and reflection patterns. Beyond the low-frequency response and spatial variation metrics established in the cuboid example, this case introduces reflection control as a critical additional optimization objective. This extended criterion evaluates the timing and amplitude of early reflections arriving at the listening position. The optimization quantifies the effectiveness of creating a Reflection Free Zone by analyzing how the non-parallel surfaces redirect potentially problematic reflections away from the listening area. Through this parametric optimization approach, the invention achieves superior control over both low-frequency modal distribution and mid-to-high frequency reflection paths, addressing the full spectrum of acoustic challenges in a single integrated solution.

Figure 23A:
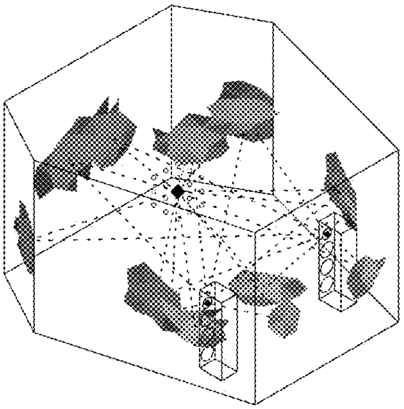
Figure 24A:
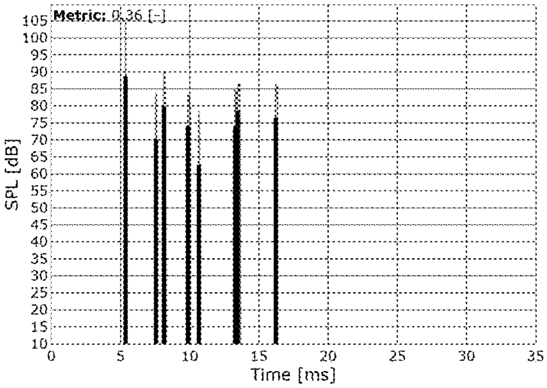
Figure 25A:
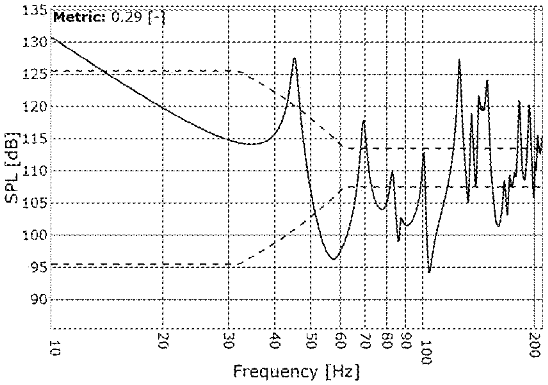
Figure 26A:
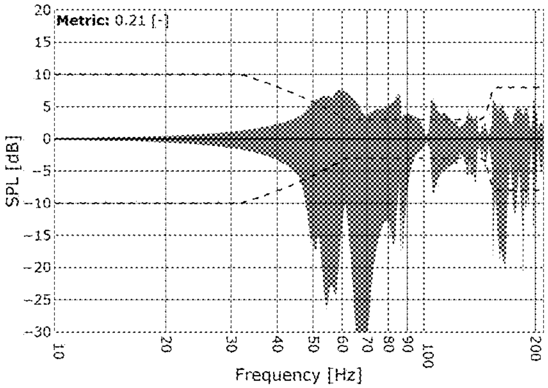

The worst-performing configuration, illustrated in FIG. 23A, reveals how arbitrary non-cuboid geometries, without proper optimization, can exacerbate acoustic problems, as evidenced by a poor low-frequency response metric value of 0.29. Despite the introduction of non parallel surfaces, this non-optimized configuration exhibits significant deviations beyond the frequency-dependent tolerance limits. The response shows particularly problematic nulls around 60 and 100 Hz that fall well outside the acceptable bounds as shown in FIG. 25A. This geometry, in combination with the positioning of the speakers and the listener, fails to distribute modal energy evenly across the frequency spectrum. The spatial variation across the listening area, characterized by a spatial variation metric value of 0.21, displayed in FIG. 26A, shows dramatic variations in the 50 to 80 Hz region where spatial variation exceeds 30 dB, creating extreme inconsistencies across the listening area. The reflectogram in FIG. 24A, with a metric value of 0.36, reveals multiple strong early reflections reaching the listening position with minimal attenuation, compromising clarity and imaging precision. This configuration demonstrates that non-parallel geometry without systematic optimization merely transforms acoustic problems rather than resolving them.

Figure 23B:
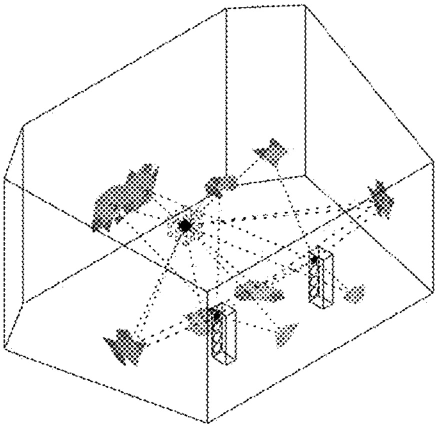
FIG. 23B shows a room with geometry optimized by the invention.
Figure 24B:
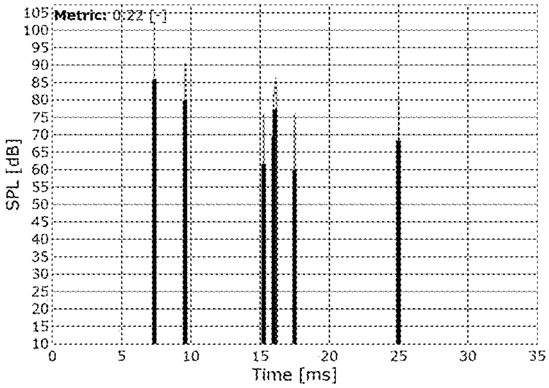
FIG. 24B shows the reflectogram for a room optimized with the method.
Figure 25B:
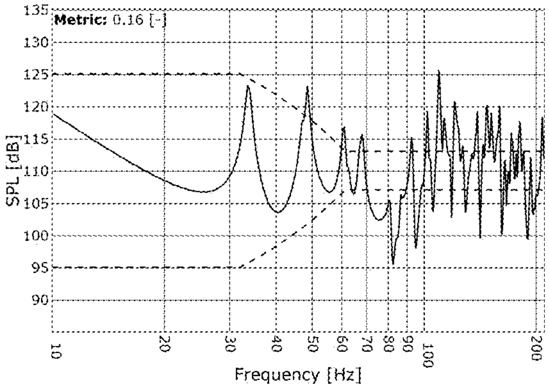
FIG. 25B shows the frequency response for a room optimized with the method.
Figure 26B:
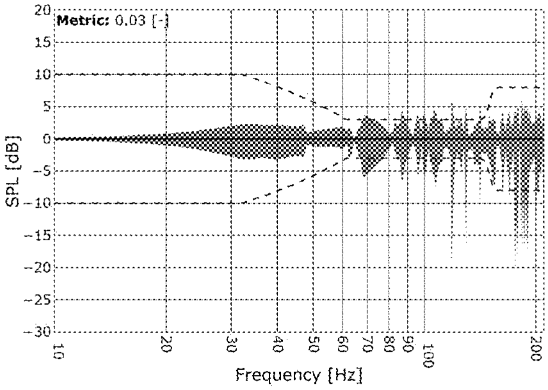
FIG. 26B shows the standard variation for a room optimized with the method.

The optimized non-cuboid room, shown in FIG. 23B, illustrates the effectiveness of the room optimization process, achieving a significantly improved low-frequency response metric of 0.16. By precisely controlling each room vertex position, the method creates a configuration that simultaneously addresses multiple acoustic objectives. The wall surfaces are precisely positioned through calculated geometric adjustments that distribute modal resonances more evenly across the frequency spectrum, reducing their amplitude and perceptual impact. This approach yields the balanced low-frequency response visible in FIG. 25B, where modal responses exhibit attenuated peaks and minimized nulls compared to the non-optimized case. The spatial variation in FIG. 26B confirms consistent frequency response throughout the listening area, evidenced by the dramatic improvement of the spatial variation metric to 0.03, reducing position-dependent anomalies. The reflectogram analysis in FIG. 24B shows a reduced number of first-order reflections that are more temporally distributed compared to the non-optimized configuration, resulting in a metric of 0.22 and creating improved clarity and definition at the listening position.

The optimized non-cuboid configuration demonstrates clear acoustic advantages through its vertex-based parametrization approach. While traditional rectangular rooms offer limited degrees of freedom for optimization, the non-cuboid methodology provides precise control over both modal behavior and reflection patterns. This integration addresses the frequency response, spatial variation, and reflection control in a single optimization process, a capability unattainable in conventional designs. The results confirm that properly optimized non-cuboid rooms can achieve superior acoustic performance while potentially reducing the need for extensive acoustic treatments. This example validates the invention's capacity to extend beyond the limitations of traditional cuboid optimization, providing a powerful tool for designing high-performance listening environments with complex geometries.

The third example illustrates the treatment optimization method applied to a cuboid room with fixed dimensions. This scenario represents applications to existing structures where architectural constraints prevent geometric modifications. The optimization parameters include the type, thickness, and placement of modular acoustic treatments on each room surface. This example demonstrates how strategic treatment placement can effectively mitigate modal issues and control reverberation characteristics even within architectural constraints.

Figure 27:
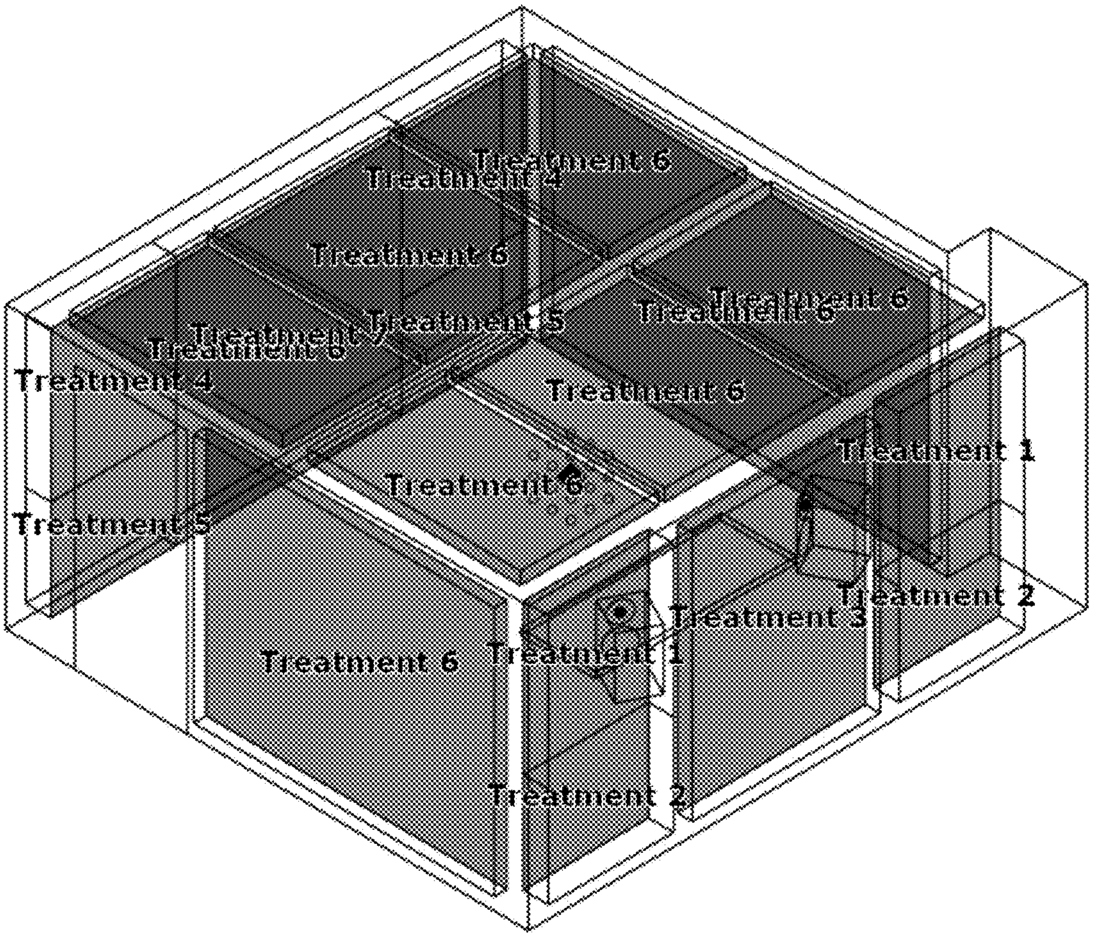
FIG. 27 shows a cuboid room with seven unique acoustic treatment locations, labeled as Treatment 1 through Treatment 7, representing the available treatment locations on the walls and ceiling with multiple available treatment options each.

In this example, a fixed cuboid room, as shown in FIG. 27, measuring 4 meters by 4 meters with a ceiling height of 2.2 meters is analyzed. The positions of speakers and the listening position are predetermined based on practical requirements and cannot be modified. The method identifies multiple treatment areas available for acoustic optimization, including all four walls and the ceiling surface. The range of acoustic treatment options evaluated by the optimization algorithm includes various combinations of porous absorbers with different thicknesses, slotted absorbers, perforated panel resonators, and diffusers. Notably, the side wall treatments were constrained to porous absorbers specifically to address first-order reflections from these surfaces. The optimization objectives focus on four critical metrics: low-frequency modal response to address the room's inherent resonances, spatial variation to ensure consistency across the listening area, modal decay control to prevent excessive ringing at resonant frequencies, and mid-to-high frequency reverberation management to achieve appropriate reverberation times for critical listening. This example illustrates how effective acoustic optimization can be achieved even when room geometry is fixed, through strategic treatment selection and placement.

Figure 28A:
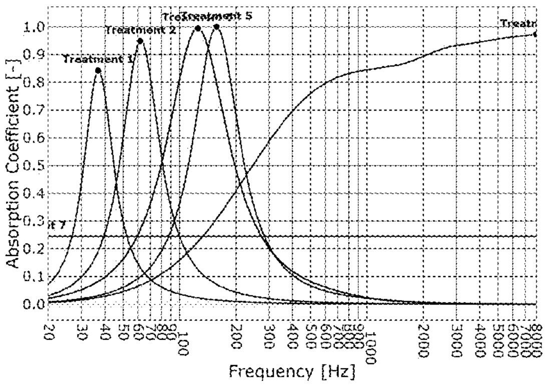
Figure 29A:
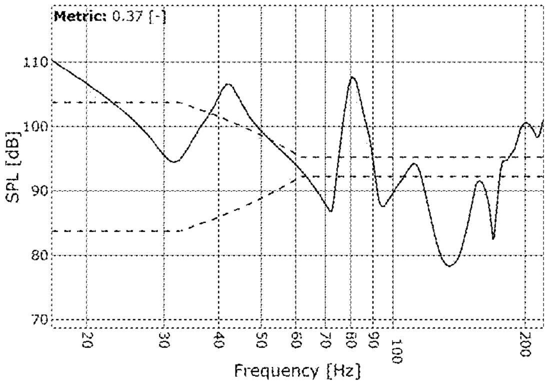
Figure 30A:
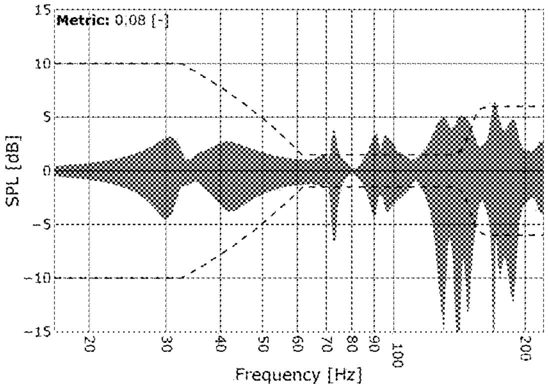
Figure 31A:
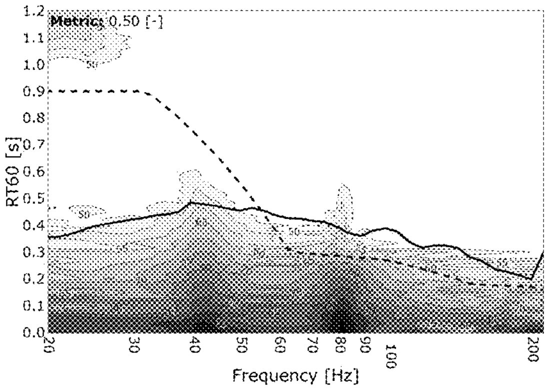
Figure 32A:
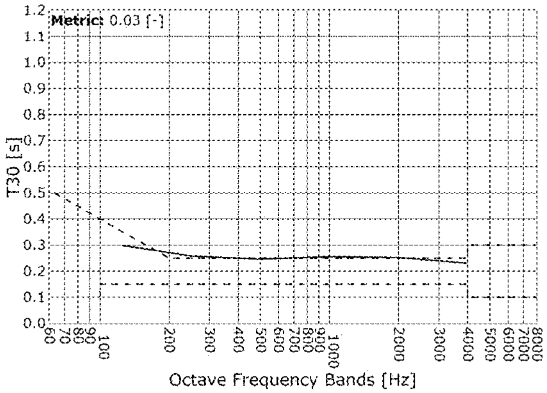

The initial configuration, though incorporating acoustic treatments, demonstrates the limitations of conventional, non-optimized approaches to room acoustics. As illustrated in FIG. 28A, the room includes acoustic treatments with absorption coefficients that vary across the frequency spectrum, but these were selected without systematic optimization. This uninformed treatment selection results in the problematic low-frequency response, visible in FIG. 29A, with a particularly problematic peak at 80 Hz reaching 108 dB and a severe null at 150 Hz dropping to 78 dB, creating an uneven frequency distribution that colors sound reproduction as evidenced by a poor low-frequency response metric value of 0.37. Despite the presence of absorptive materials, the spatial variation analysis in FIG. 30A reveals persistent inconsistencies across the listening area, indicative of treatments that fail to address specific modal behavior. The spatial variation metric value of 0.08 further illustrates the room's acoustic problems, with significant variations that extend well beyond the frequency-dependent tolerance bounds, particularly in the 120 to 170 Hz region. While the reverberation time predictions in FIG. 32A fall mostly within acceptable limits for critical listening, resulting in a low metric of 0.03, the temporal decay analysis in FIG. 31A shows problematic modal ringing that exceeds recommended thresholds. This excessive decay at specific modal frequencies, with an associated error metric of 0.50, creates audible coloration despite the apparently adequate reverberation times in mid and high frequencies. These acoustic issues highlight the challenges of treatment selection without proper optimization methodology. While certainly improved over an untreated environment, this configuration demonstrates that merely adding acoustic materials without strategic optimization fails to achieve the balanced acoustic response necessary for critical listening applications.

Figure 28B:
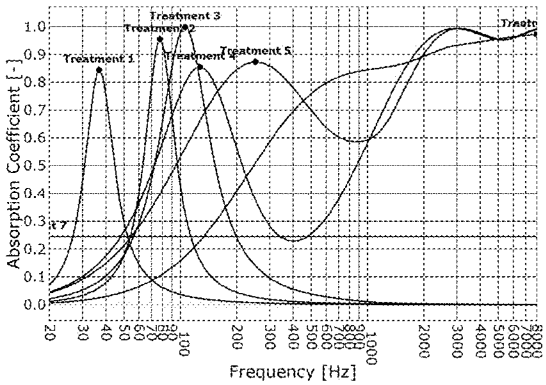
FIG. 28B shows the absorption coefficient curves for the selected option of each of the seven available treatment locations in a treatment set optimized with the method.
Figure 29B:
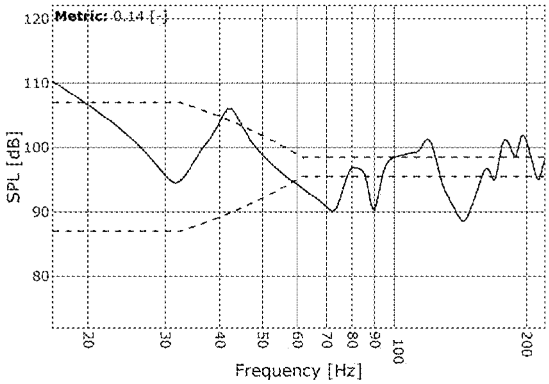
FIG. 29B shows the frequency response for a treatment set optimized with the method.
Figure 30B:
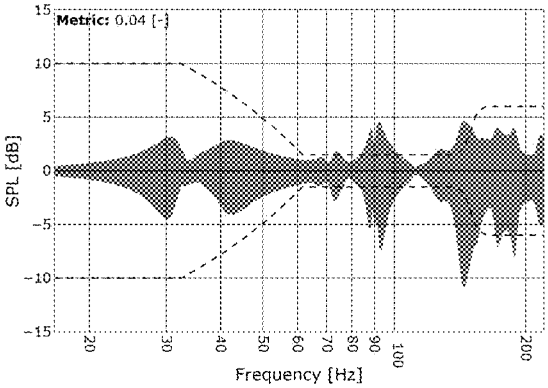
FIG. 30B shows the spatial variation plot for a treatment set optimized with the method.
Figure 31B:
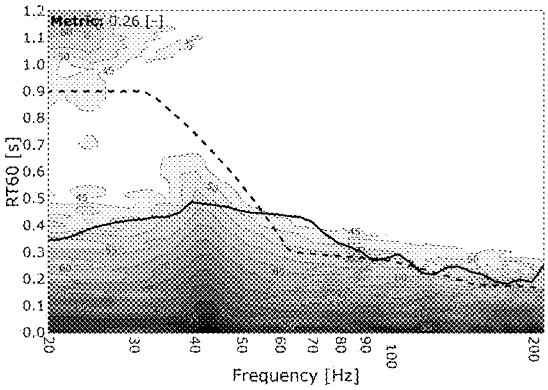
FIG. 31B shows the temporal decay plot for a treatment set optimized with the method.
Figure 32B:
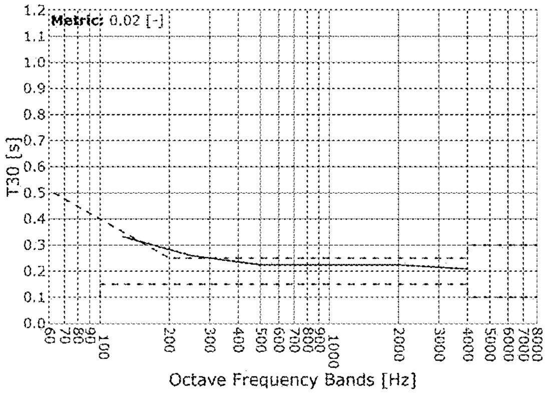
FIG. 32B shows the T30 reverberation time for a treatment set optimized with the method.

The optimized treatment configuration, shown in FIG. 27, demonstrates the effectiveness of the invention's systematic approach to acoustic treatment selection. As illustrated in FIG. 28B, the optimization algorithm selects a strategic combination of treatment types with complementary absorption characteristics across the frequency spectrum. The treatment strategy incorporates targeted low-frequency absorbers at modal pressure zones, broadband absorbers at first-reflection points, and positioned diffusive elements to maintain appropriate spatial envelopment. This optimized distribution results in a significantly improved low-frequency response shown in FIG. 29B, with an improved low-frequency response metric of 0.14 and a substantial reduction in the modal resonances that dominated the previous configuration. The spatial variation analysis in FIG. 30B reveals improved consistency across the listening area, confirmed by the reduction in the spatial variation metric to 0.04, with minimal deviations even at problematic modal frequencies that previously showed significant variations. The temporal decay characteristics in FIG. 31B demonstrate a more controlled modal ringing, approaching the perceptual thresholds, reducing the error metric to 0.26 and reducing coloration evident in the non-optimized configuration. The reverberation time predictions in FIG. 32B maintain compliance with industry standards. This optimization example illustrates how the invention's treatment optimization method can transform the acoustic characteristics of a fixed-geometry room by precisely targeting the specific modal behaviors and reflection patterns unique to that space.

The dramatic acoustic transformation demonstrated in this example underscores the power of the treatment optimization method within unchangeable spatial boundaries. When room dimensions cannot be altered, the acoustic characteristics are fundamentally determined by the complex interplay between fixed modal resonances and strategically applied treatments. This relationship creates an immense solution space where each potential treatment configuration yields different outcomes across multiple acoustic metrics simultaneously. The invention's methodology succeeds where traditional approaches falter by systematically mapping this multidimensional solution space and identifying optimal treatment combinations that human intuition might never discover. Even experienced acousticians face significant challenges when manually designing treatment schemes, as the interdependencies between absorption profiles, modal behaviors, and reflection patterns create countless potential configurations. By treating the acoustic environment as an integrated system rather than addressing discrete problems separately, the invention achieves balanced performance across all critical parameters. The results confirm that even within strict geometric constraints, the multi-objective optimization method can transform problematic listening spaces into environments suitable for the most demanding critical listening applications.

The fourth example represents the most complex application, combining geometric complexity with sophisticated treatment optimization. This scenario features a non-cuboid room with angled walls and ceiling, incorporating both modular and structurally embedded acoustic treatments. The optimization parameters include treatment types, thicknesses, and placements across the irregular geometry. This example demonstrates how the invention achieves optimal acoustic performance in complex environments by leveraging both geometric advantages and precise treatment configurations.

Figure 33:
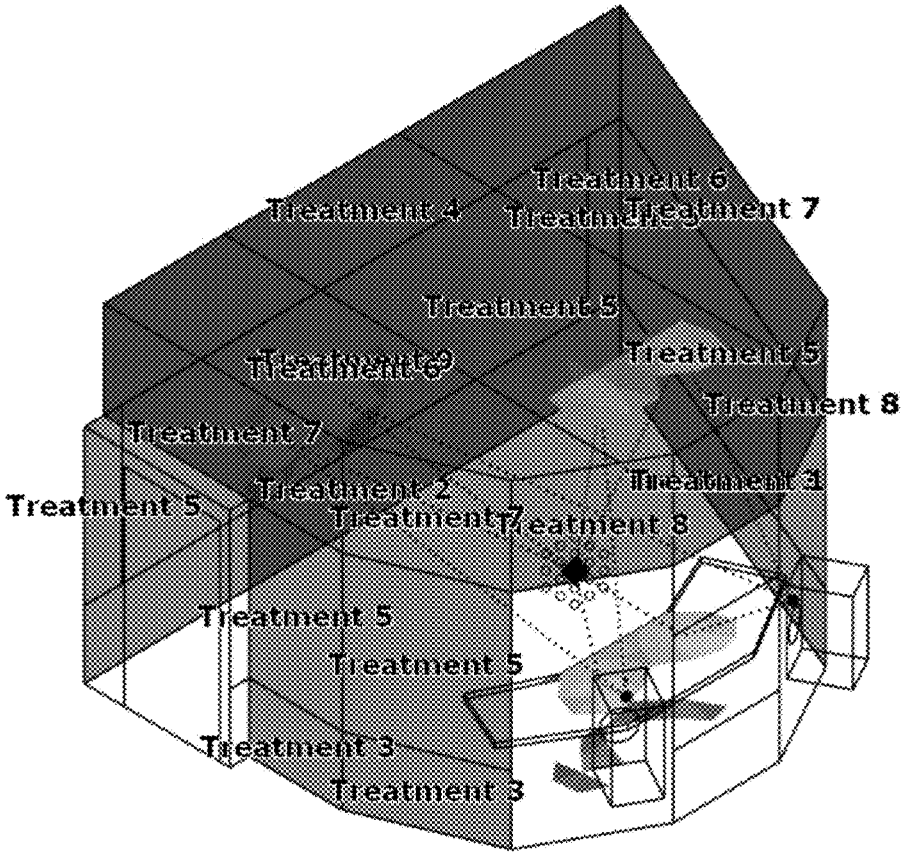
FIG. 33 shows a non-cuboid room with nine unique acoustic treatment locations, labeled as Treatment 1 through Treatment 9, representing the available treatment locations on the walls and ceiling with multiple available treatment options each.

A state-of-the-art critical listening facility, as shown in FIG. 33, with architectural complexity represents the ultimate challenge for acoustic optimization. This purpose-built environment features an asymmetrical geometry with angled walls, and a dedicated speaker wall housing flush-mounted loudspeakers. The room's irregular shape introduces complex modal behavior and reflection patterns that require carefully optimized acoustic solutions. Available treatment areas include all sidewalls, the rear wall, and the ceiling, which can accommodate a diverse range of acoustic solutions. The treatment options evaluated by the optimization method encompass both modular and structurally embedded solutions, including variable-depth porous absorbers, slotted resonators, diffusers and perforated resonators. As in the previous example, the method targets four performance metrics simultaneously. The comprehensive nature of this example demonstrates the invention's capacity to optimize complex acoustic environments where both room geometry and treatment design must work in concert to achieve superior performance.

Figure 34A:
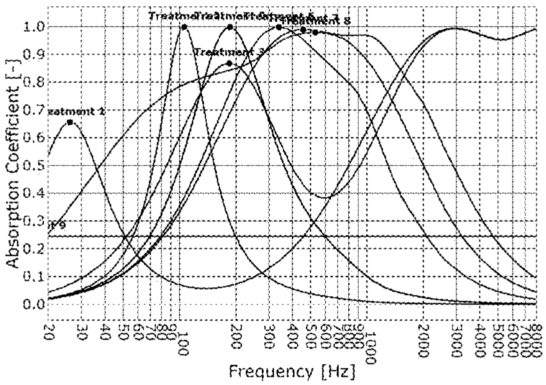
Figure 35A:
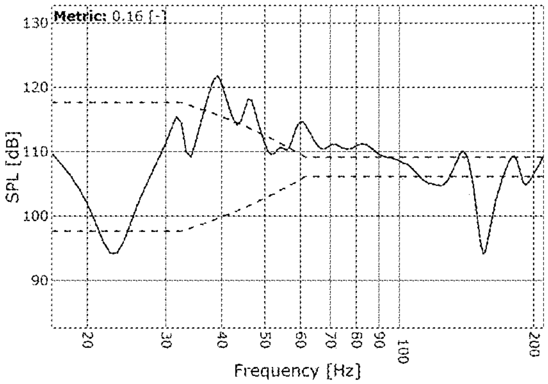
Figure 36A:
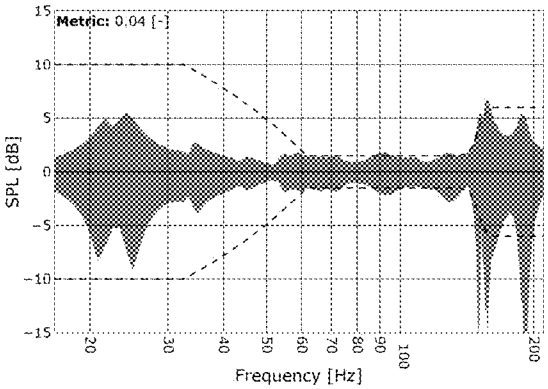
Figure 37A:
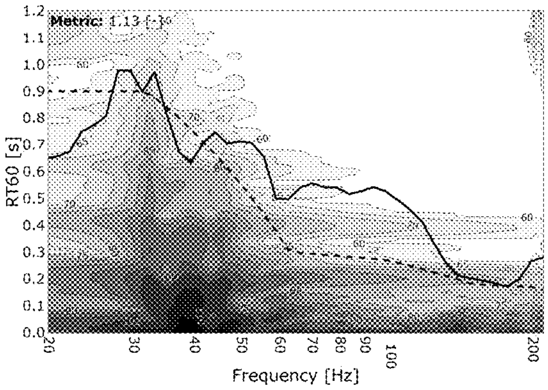
Figure 38A:
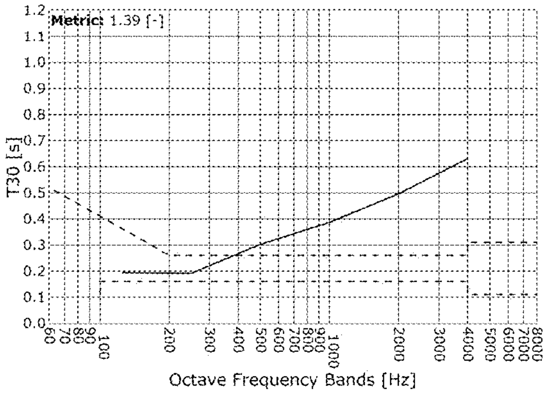

The baseline performance of the non-cuboid room with non-optimized acoustic treatments reveals that geometry and a conventional treatment selection process alone are insufficient to achieve optimal acoustic conditions. The absorption coefficient profile in FIG. 34A shows the treatment selections devised according to typical practices rather than a multi-objective optimization methodology. This approach fails to fully address the room's unique modal characteristics, as evidenced in FIG. 35A, where a pronounced null around 170 Hz and sharp peaks between 30 and 50 Hz create an uneven frequency response with a low-frequency response metric value of 0.16. The spatial variation analysis in FIG. 36A, indicates notable position-dependent frequency response variations across the listening area, resulting in a spatial variation metric value of 0.04. Most concerningly, the temporal decay characteristics in FIG. 37A exhibit excessive ringing at several modal frequencies, confirmed by the high error metric of 1.13. The reverberation time predictions in FIG. 38A show inconsistent absorption characteristics across frequency bands, with some ranges over-damped while others remain under-controlled, yielding a reverberation time metric value of 1.39. These results emphatically demonstrate that while non-rectangular geometry can theoretically distribute modal energy more evenly, actual acoustic excellence requires both appropriate architecture and optimized treatment selection and placement.

Figure 34B:
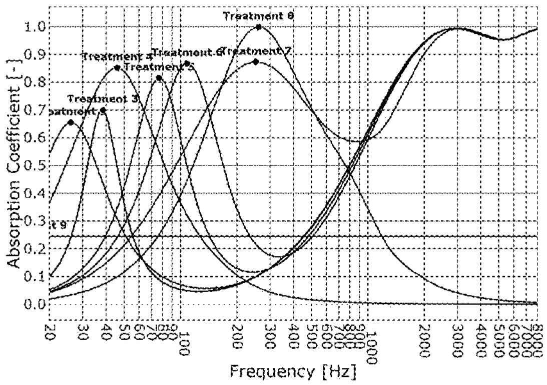
FIG. 34B shows the absorption coefficient curves for the selected option of each of the nine available treatment locations in a treatment set optimized with the method.
Figure 35B:
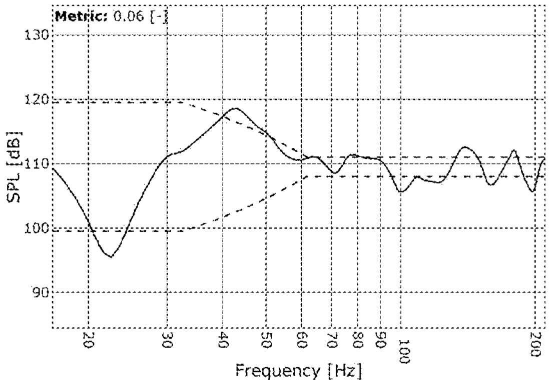
FIG. 35B shows the frequency response for a treatment set optimized with the method.
Figure 36B:
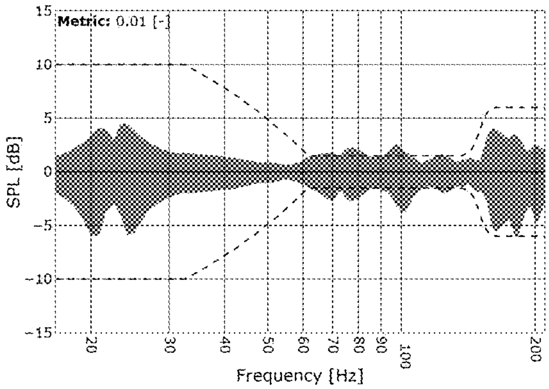
FIG. 36B shows the spatial variation for a treatment set optimized with the method.
Figure 37B:
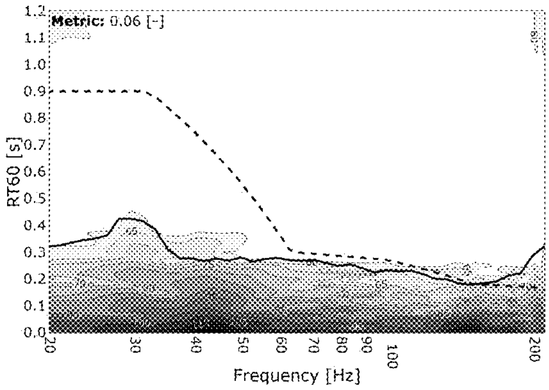
FIG. 37B shows the temporal decay for a treatment set optimized with the method.
Figure 38B:
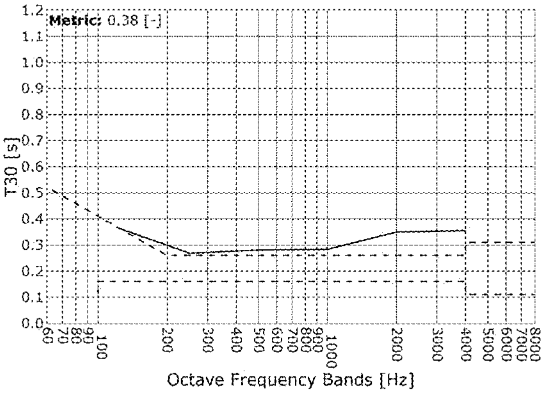
FIG. 38B shows the reverberation time for a treatment set optimized with the method.

The application of the treatment optimization method to the predetermined placement locations yields remarkable improvements across all acoustic parameters. The absorption coefficient distribution in FIG. 34B demonstrates how the optimization method creates a balanced absorption profile across frequency bands, with targeted low-frequency absorption at key areas of the room and controlled mid-high frequency attenuation. This targeted material selection effectively mitigates the substantial frequency nulls present in the non-optimized configuration, resulting in the uniform spectral response demonstrated in FIG. 35B and confirmed by the low-frequency response metric value of 0.06. The spatial analysis in FIG. 36B shows minimal variation throughout the listening region, resulting in a spatial variation metric value of 0.01. The modal decay times in FIG. 37B show substantial improvement with all resonances controlled to decay within appropriate perceptual windows, achieving a metric value of 0.06. The reverberation profile in FIG. 38B exhibits ideal spectral balance across frequency bands while maintaining the room's acoustic character. These results confirm the method's flexibility in working within established architectural and placement constraints to deliver reference-quality acoustics through precise treatment property optimization.

This last example illustrates the synergistic benefits achieved when optimized treatment selection complements thoughtful architectural design. The methodology identifies the unique modal characteristics inherent to complex geometries and tailors treatment properties specifically to address these configurations, a fundamentally different approach from applying standardized solutions to irregular spaces. This comprehensive approach yields reference-standard acoustic performance established for world-class recording and mastering facilities, with frequency linearity, spatial consistency, temporal accuracy, and controlled reverberation characteristics that support critical decision-making in audio production. By quantifying and systematically addressing the complex interactions between room shape and acoustic treatment properties, the invention enables the creation of sophisticated listening environments that combine architectural distinction with acoustic excellence, without compromising either objective.

These four application examples collectively demonstrate the versatility and effectiveness of the invention across a wide spectrum of geometric and acoustic constraints. From basic cuboid rooms to complex non-cuboid geometries with sophisticated treatment schemes, the invention provides a systematic approach through both room optimization and treatment optimization methods that yields measurable, significant improvements in all critical performance metrics: controlled low-frequency response, minimized spatial variation, controlled modal decay, appropriate reverberation times, and managed early reflections. The examples further illustrate the invention's practical applicability to both new construction scenarios, where room geometry can be freely optimized, and retrofit applications, where existing architectural constraints must be accommodated through strategic treatment optimization.

What is claimed:

1. A method of optimizing audio perception by a listener or listeners located in any shaped room, including the following:

a) identifying a room enclosing a volume, said room having existing dimensions or planned variable dimensions comprising length, width and height;

b) identifying said dimensions;

c) identifying one or more sound source(s) and their characteristics;

d) defining optimal low-frequency response as a flat frequency response;

e) defining optimal spatial variation as zero spatial variation;

f) defining optimal early reflections arriving at location(s) of said listener or listeners prior to a reflection of a most distal surface in said room with respect to said listener or listeners as reflections having an amplitude at least 20 decibels below ne a level of direct sound;

g) simultaneously optimizing locations of said one or more sound source(s) and a location(s) of said listener(s) by sequentially considering differing options for locations of said sound source(s) and said listener(s) and for each option simultaneously calculating low-frequency response, spatial variation and early reflections and comparing calculations with optimal values for low-frequency response, spatial variation and early reflections;

h) choosing an option for locations of said sound source(s) and listener(s) for which said calculations of low-frequency response, spatial variation and early reflections are, in combination, close to optimal values;

i) locating said one or more sound source(s) in optimal location(s) based upon said calculations; and j) locating said listener(s) in optimal location(s) based upon said calculations.

2. The method of optimizing audio perception by a listener or listeners located in any shaped room of claim 1, wherein said room has existing dimensions.

3. The method of optimizing audio perception by a listener or listeners located in any shaped room of claim 1, wherein said room has planned variable dimensions and said method includes determining a detailed three-dimensional geometric model of said room.

4. The method of optimizing audio perception by a listener or listeners located in any shaped room of claim 3, wherein said one or more sound source(s) comprise plural sound sources and said method includes a determination of acoustic specifications of said one or more sound source(s).

5. The method of optimizing audio perception by a listener or listeners located in any shaped room of claim 4, wherein there is a single listener.

6. The method of optimizing audio perception by a listener or listeners located in any shaped room of claim 1, wherein said early reflections arrive at a location of a listener prior to subsequent reflections arriving at said location of said listener after a reflection of a most distant surface to with respect to said listener.

7. The method of optimizing audio perception by a listener or listeners located in any shaped room of claim 1, further including the steps of using geometric acoustics techniques to calculate the early reflections of said sound source(s) at a location or locations of said listener(s).

8. The method of optimizing audio perception by a listener or listeners located in any shaped room of claim 1, further including the step of using a wave-based technique to calculate low-frequency response and spatial variation from said sound source(s) at a location or locations of said listener(s).

9. The method of optimizing audio perception by a listener or listeners located in any shaped room of claim 1, further including the step of employing an iterative multi-objective search engine to optimize low-frequency response and spatial variation and minimize early reflections of sound within said room.

10. The method of optimizing audio perception by a listener or listeners located in any shaped room of claim 1, further including the steps of defining maximum and minimum volumes and dimensions within said room, identifying construction materials for walls, floor and ceiling of said room and determining impact of nature of those materials on sound perception by listener(s) and calculating any necessary compensation for said impact.

11. The method of optimizing audio perception by a listener or listeners located in any shaped room of claim 10, wherein after calculating any necessary compensation for said impact, designating preferred locations for sound source(s) and listener(s) simultaneously along with a preferred room shape and volume for which said calculations of low-frequency response, spatial variation and early reflections are, in combination, close to optimal values.

12. The method of optimizing audio perception by a listener or listeners located in any shaped room of claim 1, further including the step of creating a digital library of acoustical treatments.

13. The method of optimizing audio perception by a listener or listeners located in any shaped room of claim 12, wherein said acoustical treatments include diffusers, low-frequency resonators and mid- and high-frequency absorbers.

14. The method of optimizing audio perception by a listener or listeners located in any shaped room of claim 13, wherein each acoustical treatment stored in said library includes performance specifications.

15. The method of optimizing audio perception by a listener or listeners located in any shaped room of claim 14, further including the step of searching said library and identifying one or more of said acoustical treatments that will further enhance audio perception of a listener or listeners, and determining where said acoustical treatment(s)

should be installed in said room to enhance said audio perception, including the following:

a) identifying available locations for said acoustical treatments to be placed;

b) identifying available areas of said acoustical treatments;

c) identifying available depths of said acoustical treatments;

d) defining optimal low-frequency temporal decay as having modal reverberation times below audible perception thresholds; and e) defining optimal mid- and high-frequency reverberation times as values within standard recommended limits for said room volume.

16. The method of optimizing audio perception by a listener or listeners located in any shaped room of claim 15, further including the step of employing an iterative multi-objective search engine to optimize low-frequency response, spatial variation, low-frequency temporal decay and mid- and high-frequency reverberation time.

17. A method of optimizing audio perception by at least one listener located in a room, including the following:

a) identifying a room enclosing a volume, said room having planned variable dimensions comprising length, width and height;

b) identifying said dimensions;

c) identifying at least one sound source and their characteristics thereof;

d) defining optimal low-frequency response as a flat frequency response;

e) defining optimal spatial variation as zero spatial variation;

f) defining optimal early reflections arriving at location of said at least one listener prior to a reflection of a most distal surface in said room with respect to said at least one listener as reflections having an amplitude at least 20 decibels below a level of direct sound;

g) simultaneously optimizing location of said at least one sound source and location of said at least one listener by sequentially considering differing options for locations of said at least one sound source and said at least one listener and for each option simultaneously calculating low-frequency response, spatial variation and early reflections and comparing calculations with optimal values for low-frequency response, spatial variation and early reflections;

h) choosing an option for location of said at least one sound source and listener for which said calculations of low-frequency response, spatial variation and early reflections are, in combination, close to optimal values;

i) locating said at least one sound source in optimal location based upon said calculations; and j) locating said at least one listener in optimal location based upon said calculations.

18. A method of optimizing audio perception by at least one listener located in a room of claim 17, further including the step of creating a digital library of acoustical treatments, said acoustical treatments including diffusers, low-frequency resonators and mid- and high-frequency absorbers and wherein each acoustical treatment stored in said library includes performance specifications.

19. A method of optimizing audio perception by at least one listener located in a room of claim 17, further including the step of searching said library and identifying one or more of said acoustical treatments that will further enhance audio perception of said at least one listener, and determining where said acoustical treatment(s) should be installed in said room to enhance said audio perception, including the following:

a) identifying available locations for said acoustical treatments to be placed;

b) identifying available areas of said acoustical treatments;

c) identifying available depths of said acoustical treatments;

d) defining optimal low-frequency temporal decay as having modal reverberation times below audible perception thresholds; and e) defining optimal mid- and high-frequency reverberation times as values within standard recommended limits for said room volume.

20. A method of optimizing audio perception by at least one listener located in a room of claim 17, wherein said at least one sound source comprises a plurality of sound sources.

* * * * *